(12) United States Patent  (10) Patent No.: US 8,803,882 B2
Lam et al.  (45) Date of Patent: Aug. 12, 2014

(54) IDENTIFYING ON A GRAPHICAL DEPICTION CANDIDATE POINTS AND TOP-MOVING QUERIES

(75) Inventors: Andy Lam, Seattle, WA (US); Jamie P. Buckley, Redmond, WA (US); Hugh Evan Williams, Redmond, WA (US); Nicholas Eric Craswell, Cambridge (GB); Tabreez Govani, Mukilteo, WA (US)

(73) Assignee: Microsoft Corporation, Redmond, WA (US)

( * ) Notice: Subject to any disclaimer, the term of this patent is extended or adjusted under 35 U.S.C. 154(b) by 1247 days.

(21) Appl. No.: 12/134,334

(22) Filed: Jun. 6, 2008

(65) Prior Publication Data

US 2009/0303238 A1   Dec. 10, 2009

(51) Int. Cl.
*G06T 11/20* (2006.01)
*G06F 17/30* (2006.01)

(52) U.S. Cl.
USPC .......................................................... 345/440

(58) Field of Classification Search
CPC ................... G06F 17/30554; G06F 17/30651; G06T 11/206
USPC ......................................................... 345/440
See application file for complete search history.

(56) References Cited

U.S. PATENT DOCUMENTS

| | | | |
|---|---|---|---|
| 6,718,324 B2 | 4/2004 | Edlund | |
| 7,136,845 B2 | 11/2006 | Chandrasekar | |
| 2006/0224554 A1 | 10/2006 | Bailey | |
| 2006/0253428 A1 | 11/2006 | Katariya | |
| 2007/0038620 A1 | 2/2007 | Ka | |
| 2007/0038624 A1 | 2/2007 | Choi | |
| 2007/0100824 A1 | 5/2007 | Richardson | |
| 2007/0244883 A1 | 10/2007 | Bessieres | |
| 2008/0016019 A1 | 1/2008 | Loftus | |

FOREIGN PATENT DOCUMENTS

EP   1843256 A1   10/2007

OTHER PUBLICATIONS

Mouratidis et al, Continuous Monitoring of Top-k Queries over Sliding Windows, http://www.mysmu.edu/faculty/kyriakos/topk-SIGMOD06.pdf, Jun. 2006.
Chellapilla et al, Improving Cloaking Detection Using Search Query Popularity and Monetizability, http://airweb.cse.lehigh.edu/2006/chellapilla.pdf, Aug. 10, 2006.
Mashiach, Learning to Rank: A Machine Learning Approach to Static Ranking, http://www.cs.technion.ac.il/~litalma/notes_lectures/LearningtoRank.pdf, Jul. 9, 2006.

*Primary Examiner* — Jeffery A Brier
(74) *Attorney, Agent, or Firm* — Dave Ream; Peter Taylor; Micky Minhas

(57) ABSTRACT

Computer-readable media and computerized methods for identifying candidate points on a graphical depiction of relative popularity of an entity (e.g., entertainer, sports team, and the like) are provided. Points on the graphical depiction are ranked based on a number of user-submitted web queries that reference the entity that are received during a particular time frame. Peak points and slope values (i.e., derived from an angle of inclination of inclines on the graphical depiction) may be captured by analyzing movements in the rank of an entity over time. An algorithmic process may then be applied to the peak points and slope values to determine points of interest of the entity's popularity, such as the highest-ranked periods and/or dramatic positive movements in rank of the entity. These points of interest are selected as candidate points and are surfaced as icons on a visual representation of the graphical depiction.

13 Claims, 14 Drawing Sheets

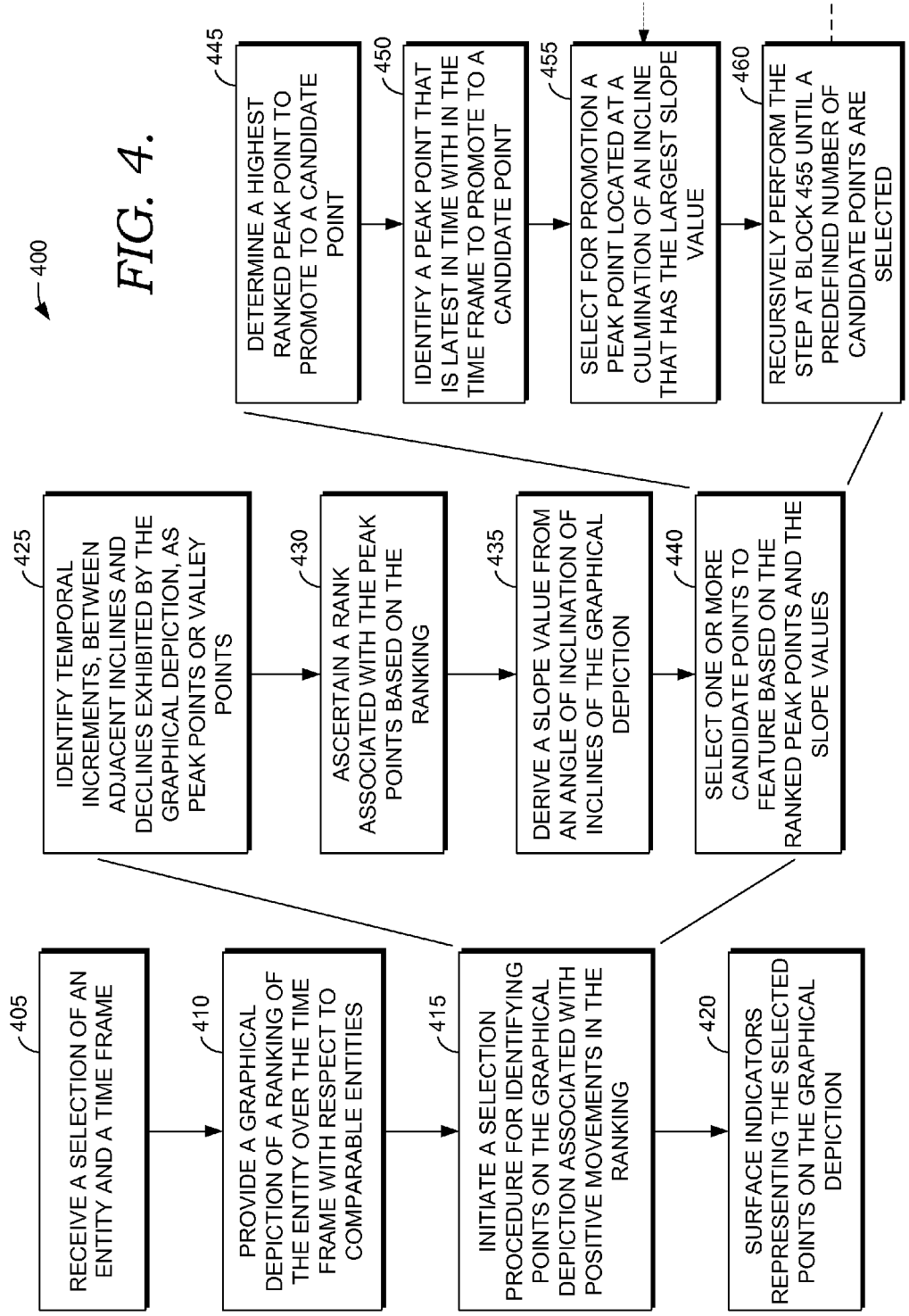

IDENTIFYING ON A GRAPHICAL DEPICTION CANDIDATE POINTS AND TOP-MOVING QUERIES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Various techniques exist that enable Internet-based search engines to receive and process queries from users and to provide search results based thereon. Because these search engines are typically coupled with data stores, such information as queries, search results, and other search data may be conveniently stored for subsequent access. Analysis of this available search data may be interesting to identify trends within patterns of Internet use. However, existing methods for retrieving the search data are ineffective for detecting these trends. Moreover, these existing methods are inappropriate for properly managing the search results to extract meaningful information related to why users are querying an entity (e.g., people, sports teams, cities, and companies) within a particular time frame. Present techniques do not offer sufficient evaluation of the search data to identify and explain adjustments of the popularity of entities. Accordingly, employing a procedure to select peak points of popularity for a particular subject and render queries that explain the peak points would uniquely leverage the query data collected at a search engine and would enhance a user's experience searching the particular subject.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention generally relate to computer-readable media and computerized methods for identifying candidate points on a graphical depiction of relative popularity of an entity (e.g., entertainer, sports team, product, geographic location, song, movie, company, software tool, or another web-searchable subject). The graphical depiction is typically a line graph expressing a rank of the entity, in relation to other entities of a similar subject matter, over a time frame. By way of example only, a graphical depiction of entertainer Kevin Spacey would visually indicate his rank with respect to other actors at regular temporal increments (e.g., month, week, day, hour) within a particular time frame. In an exemplary embodiment of this example, the rank is based on a number of user-submitted web queries that reference Kevin Spacey, received during each temporal increment, in comparison with all user-submitted web queries that reference actors.

Peak points, valley points, and slope values (i.e., derived from an angle of inclination of inclines of the graphical depiction) may be captured by analyzing movements in the rank of an entity over the time frame. An algorithmic process may then be applied to the peaks and slope values to determine points of interest of the entity's popularity over the time frame, such as the highest-ranked periods and/or the dramatic positive movements in rank of the entity. These points of interest, or candidate points, typically indicate an upward trend in web queries that are referencing the entity.

In addition, top-moving queries may be extracted from the user-submitted web queries that reference a particular entity. The top-moving queries reflect the most-commonly used search terms within the user-submitted web queries for the particular entity during a particular temporal increment. Typically the particular temporal increments are associated with the candidate points. The process of extraction includes sorting the user-submitted queries into query groups according to the search terms that are common to the retrieved user-submitted queries, enumerating the user-submitted queries assigned to each of the query groups, and ranking the query groups based on the enumeration. Accordingly, the query groups with the largest number of user-submitted queries assigned thereto are ranked highly. Various filters (e.g., title-matching filter, adult filter, common-used-keyword filter, duplicate-query filter) may be applied to the ranked query groups to remove uninteresting or repetitive queries. The remaining highly ranked user-submitted queries are identified as the top-moving queries.

In an exemplary instance, these top-moving queries represent the most popular queries that helped generate a rise in the popularity of an entity (i.e., causing the abrupt positive movement in rank), which resulted in establishing a candidate point. Accordingly, the top-moving queries, when surfaced at a user-interface (UI) display, provide insight into what other users who are interested in the same entity are searching for. Expanding on the example above, a rise in popularity for the actor Kevin Spacey during a temporal increment of April 2008 may coincide with the release of the movie "21," in which he is featured. As such, the top-moving queries for a candidate point at this temporal increment would likely include the search term "21" and would help explain the rise of Kevin Spacey's web-query popularity. In addition to explaining why Kevin Spacey is popular at certain time intervals, surfacing the top-moving queries may provide a way for users to view other queries related to Kevin Spacey that may be of interest to them.

BRIEF DESCRIPTION OF THE DRAWINGS

The present invention is described in detail below with reference to the attached drawing figures, wherein:

FIG. 4 is a flow diagram illustrating an overall method for identifying one or more candidate point(s) based on a ranking of an entity over time, in accordance with an embodiment of the present invention;

DETAILED DESCRIPTION

Figure 1:
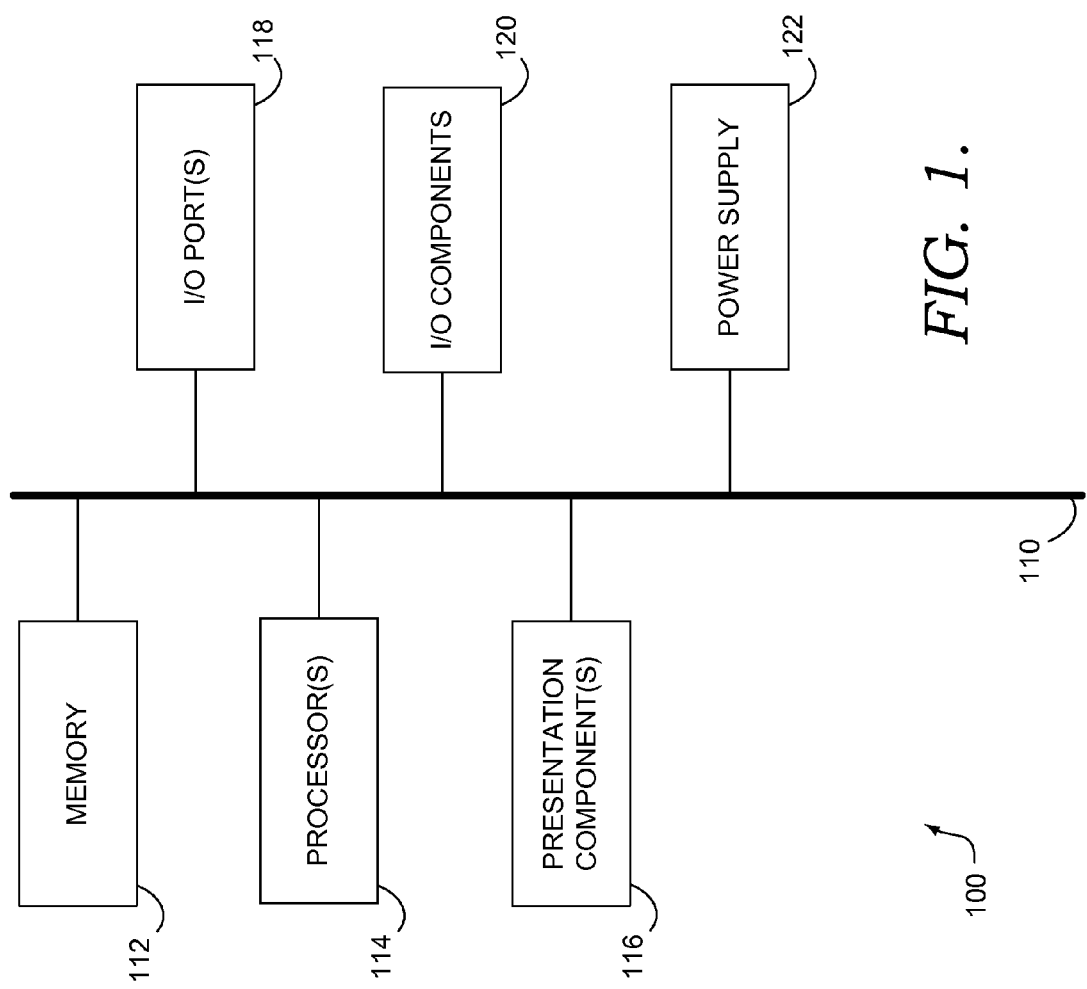
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Accordingly, in one embodiment, the present invention relates to computer-executable instructions, embodied on one or more computer-readable media, that perform a method for automatically selecting one or more candidate points on a graphical depiction of user-submitted queries referencing an entity. Initially, the method includes, in embodiments, receiving a user-initiated selection of the entity and a time frame in which the user-submitted queries referencing the entity are to be retrieved. Typically, the time frame is divided into temporal increments. The graphical depiction of a rank of the entity over the time frame is provided, where the rank represents a relative popularity of the entity, in relation to a plurality of entities of a predefined category. In addition, the rank may be determined from the user-submitted queries collected at a search engine. A selection procedure for identifying the candidate points on the graphical depiction, which are each associated with a positive movement of the rank, is automatically initiated. In an exemplary embodiment, the selection procedure includes, in no particular order, the following steps: identifying locations on the graphical depiction between adjacent inclines and declines as peak points and valley points; ascertaining the rank at the temporal increments corresponding with each of the peak points and the valley points; deriving slope values based on an angle of inclination of the inclines; and, based on the rank of the peak points and the valley points, and the slope value, selecting the candidate points.

In one instance, selecting the candidate points includes, at least, comparing the rank associated with each of the peak points against each other to determine a highest ranked peak point, and identifying the highest ranked peak point as one of the candidate points. In another instance, selecting the candidate points includes, at least, identifying a peak point that is latest in time within a scope of the time frame, ascertaining that the slope value of an incline precedent to the latest temporal increment is greater than a predefined threshold slope, and identifying the latest peak point as one of the candidate points. In yet another instance, selecting the candidate points includes, at least, identifying a remainder of the peak points that are not identified as one of the candidate points, comparing the slope values of the inclines adjacent to the remaining peak points, and identifying a peak point of the remaining peak points adjacent to an incline having a greatest slope value as one of the candidate points. Often, the method includes surfacing the selected candidate points by presenting, at a user-interface (UI) display, an indicator of each of the selected candidate points on the graphical depiction.

In another embodiment, aspects of the present invention involve a computerized method, implemented at a computing device, for selecting one or more candidate points based on a ranking of an entity. Typically, the ranking is rendered at temporal increments that uniformly divide a predetermined time frame. Initially, the method may include ascertaining a rank associated with each of the temporal increments within the predetermined time frame. Generally, the rank represents a relative popularity of the entity, as determined from a number of queries referencing the entity received at a search engine, in relation to a plurality of entities within a predefined category. A temporal increment that has a rank associated with it that is higher than the rank associated with a remainder of the temporal increments is identified. The identified temporal increment may be selected for inclusion into the candidate peak points.

In embodiments, a determination that a rank of a temporal increment immediately preceding a latest temporal increment is lower than a rank of the latest temporal increment is performed. The latest temporal increment may be selected for inclusion into the one or more candidate points for surfacing. Positive movements of the rank of the entity between the temporal increments are determined based, in part, on a comparison of the rank associated with each of the temporal increments and a rank associated with a chronologically-preceding temporal increment. These determined positive movements are compared against each other to discern a largest positive movement. A temporal increment at a culmination of the largest positive movement may be selected for inclusion into the candidate points. In some instances, the method includes storing, at least temporarily, the candidate points at a data store.

In yet another embodiment, the present invention encompasses one or more computer-readable media that has computer-executable instructions embodied thereon that, when executed, perform a method for automatically selecting one or more top-moving queries associated with one or more candidate points on a graphical depiction. Typically, the graphical depiction is a diagrammatic expression of user-submitted queries referencing an entity. Initially, the method generally includes retrieving the user-submitted queries containing search terms referencing the entity. In one instance, these user-submitted queries are retrieved for each temporal increment within a time frame of the graphical depiction. The candidate points associated with a positive movement of relative popularity of the entity are identified. A selection procedure to determine which of the retrieved user-submitted queries associated with the one or more candidate points to surface at a graphical user interface (UI) may be invoked. The selection procedure generally includes, in no particular order, the following steps: assigning the retrieved user-submitted queries to query groups according to the search terms that are common to the retrieved user-submitted queries; enumerating the user-submitted queries assigned to each of the query groups; removing from consideration the query groups associated with the common search terms that occur less than a predefined threshold; ranking the query groups, based on the enumeration, such that the query groups associated with the common search terms that occur frequently are ranked highly; and applying one or more filters to the ranked query groups to identify the top-moving queries from the common search terms. These top-moving queries may be stored in association with the candidate points.

In embodiments, the method may further include selecting a predefined number of query groups that are high in the ranking. Common search terms associated with the selected query groups may be identified as the top-moving queries. In addition, these top-moving queries may be surfaced at a user-interface (UI) display in a location proximate to the graphical depiction.

Having briefly described an overview of embodiments of the present invention and some of the features therein, an exemplary operating environment suitable for implementing the present invention is described below.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks or implements particular abstract data types. Embodiments of the present invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear and, metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVDs) or other optical or holographic media; magnetic cassettes, magnetic tape, magnetic disk storage or other magnetic storage devices; or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
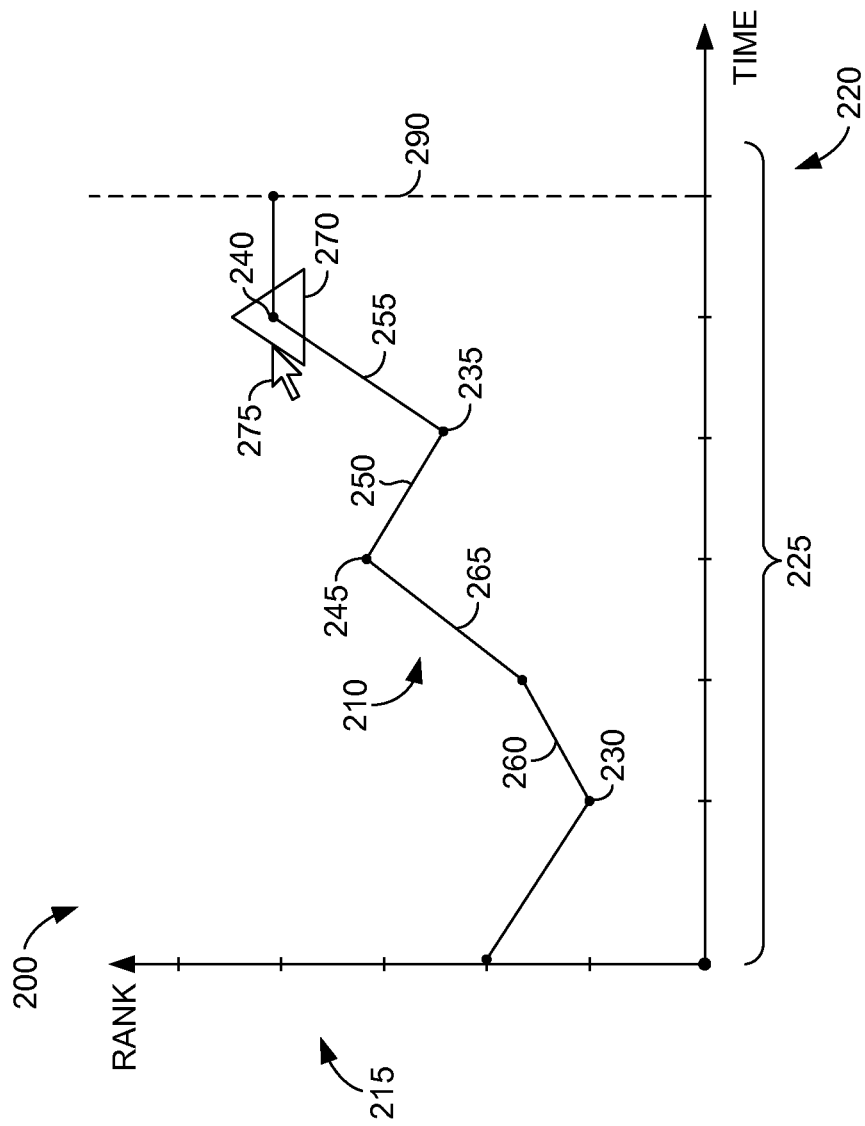
FIG. 2 is a graphic depiction of search trends indicating a movement in rank of an entity over time, in accordance with an embodiment of the present invention.

Some embodiments of the present invention generally relate to identifying candidate point(s) from a graphical depiction of a rank in query popularity of an entity over time. Features of the graphical depiction that allow for identifying the candidate point(s) will now be discussed with reference to FIG. 2. In particular, FIG. 2 shows a graphic depiction 200 of search trends indicating a movement in rank 215 of an entity over time 220, in accordance with an embodiment of the present invention. Initially, the graphical depiction 200 includes an axis that represents the time 220 over which the popularity of an entity may fluctuate. This fluctuation is graphically displayed in the form of a line chart 210 that interconnects plotted rank values, where the rank values are based on a number of collected user-submitted queries (e.g., web queries submitted at a web browser) that reference the entity and is compared against a number of collected user-submitted queries that reference each other entity within the same category (e.g., people, sports teams, products, geographic locations, music, companies, tools, or types of entertainers). In embodiments, the entities within a category are limited to a discrete list that is expandable to include or exclude entities based on upward or downward movements in query popularity, respectively. Because, search engines typically serve to receive and process these user-submitted queries, they are in a unique position to leverage these queries to develop and update the rank 215, to support generating the graphical depiction 200 of rank 215, to furnish identifying candidate point(s) 240, and to facilitate selection of top-moving queries (not shown).

The axis of the time 220, in embodiments, is divided into temporal increments 225. These temporal increments 225 may vary in the length of the time period that they encompass. Typically the time period of the temporal increments 225 is based on a time frame 290 over which the graphical depiction 200 is generated. By way of example only, if the time frame 290 is a year, the temporal increments 225 may be months. If the time frame 290 is a month, the temporal increments 225 may be weeks. If the time frame 290 is a week, the temporal increments 225 may be days. If the time frame 290 is a day, the temporal increments 225 may be hours, and so on. Although the temporal increments 225 are described as uniformly dividing the time frame 290, embodiments of the present invention contemplate additional formats for variably dividing the time frame 290 utilizing a variety of approaches known in the relevant field. In addition, although embodiments, of this invention are directed toward the graphical depiction 200 of the rank 215 of the entity over the time 220, it should be understood and appreciated by those of ordinary skill in the art that candidate points may be determined from other types of graphical depictions (e.g., displaying characteristics of an entity) on Cartesian coordinates, and that embodiments of the present invention are not limited to those rank-related graphical depictions 200 described herein.

Along the line chart 210 are fluctuations in the rank 215 that reflect movements in query popularity of an entity. These fluctuations may be analyzed, utilizing an algorithmic selection procedure discussed more fully below, to identify various features of the line chart 210 and to select candidate points based on those features. These features include inclines 260, 265, and 255, a decline 250, valley points 230 and 235, and peak points 240 and 245. Upon executing the selection procedure, an indicator for each of the identified candidate points may be presented at a user-interface (UI) display of the graphical depiction 200. As illustrated, the peak point 240 is identified as a candidate point by the indicator 270.

In embodiments, presenting includes surfacing an icon substantially overlaying the peak points associated with the candidate points. As illustrated, the indicator 270 may be an icon or any other graphic known in the relevant art that is suitable for distinguishing a location on a chart. In addition, the icon may expose information related to its respective peak point 240 upon detecting a user-initiated indication thereof. A selection tool 275, or cursor, may be maneuvered by a user to select the indicator 270, as illustrated in FIG. 2. Selection may include hovering the selection tool 275 within the proximity of the indicator 270, clicking the indicator 270, physically choosing the indicator 270 on a touchscreen display, or by any selection method known in the software-design industry.

Upon selection of the indicator 270, information related to the peak point 240 may be exposed that reveals the cause of the rise in rank at that particular temporal increment. In an exemplary embodiment, upon selection of the indicator 270, the top-moving queries (not shown), which are responsible for the establishment of the candidate point, are surfaced. Generally, the top-moving queries are surfaced in an area proximate to the graphical depiction 200, in a pop-up display area linked to the indicator 270, or any other method of displaying a textual information presently implemented. In other embodiments, selection of the indicator 270 causes an explanation object to be displayed in association with the icon. Typically, the explanation object communicates representation(s) of user-submitted queries to rationalize the indicated peak point 240.

Although two types of methods for surfacing information upon selection of an indicator or icon have been discussed above, it should be understood and appreciated by those of ordinary skill in the art that other types of suitable mechanisms that provide information related to a candidate point are contemplated herein, and that embodiments of the present invention are not limited to those UIs described or illustrated.

The feature of the angle of inclination will now be discussed with reference to FIG. 2. As illustrated, the angle of inclination of the incline 260 is less than an angle of inclination of the incline 265, while the angle of inclination of the incline 255 is the largest of the three inclines. As discussed more fully below with reference to FIG. 3, a slope value is derived from the angle of inclination of each of the inclines 255, 260, and 265 within the graphical depiction 200. In this illustrated example, the slope value of the incline 255 will be the greatest, while the slope value of the incline 260 will be the lowest. In embodiments, the slope value may be computed by developing a ratio of a rise in rank over a time period between two or more of the temporal increments 225.

Figure 3A:
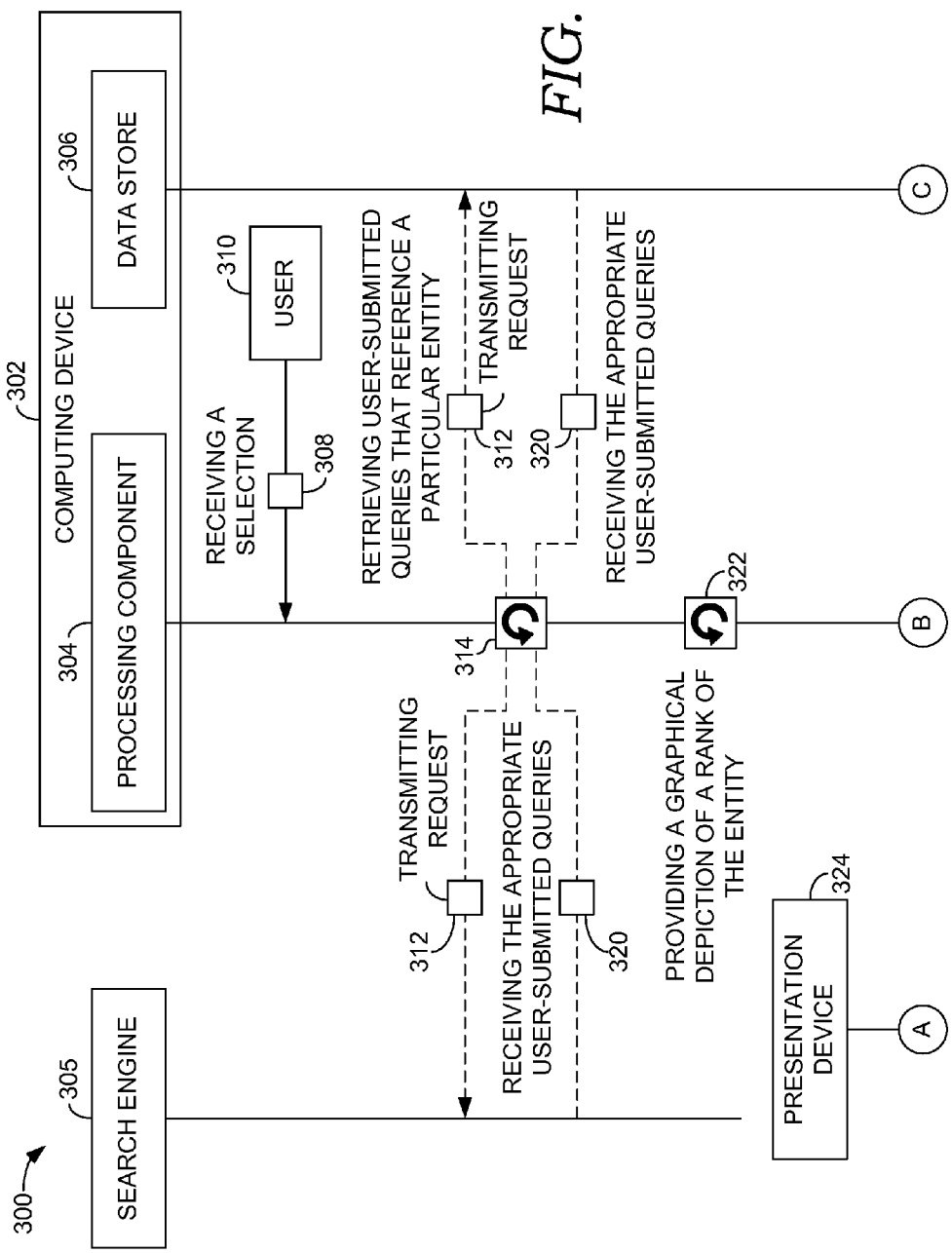
FIGS. 3A-3C are diagrammatic flow charts illustrating a process for automatically selecting candidate point(s) and identifying top-moving queries associated with the candidate points implemented on suitable exemplary system architecture, in accordance with an embodiment of the present invention.
Figure 3B:
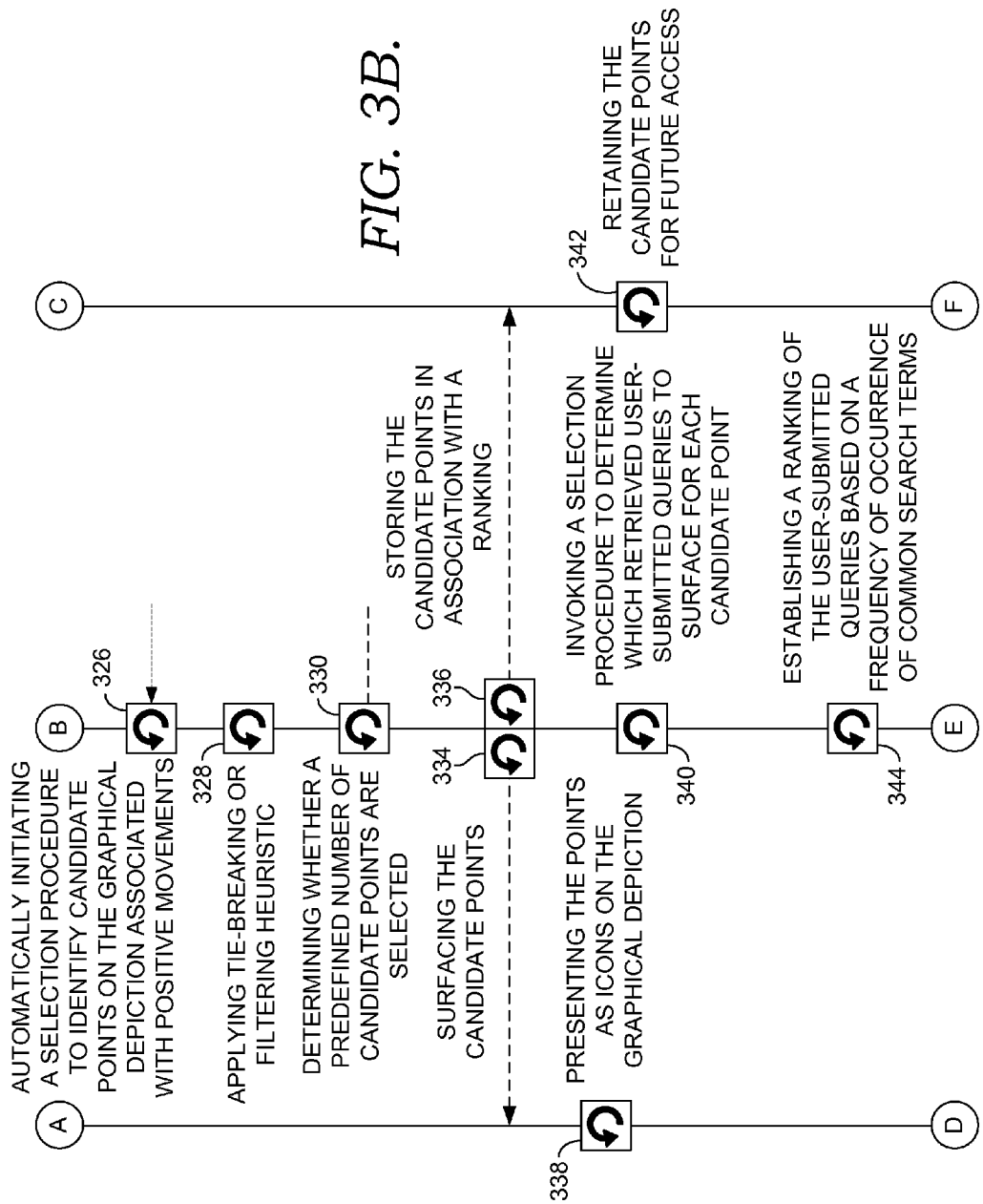
Figure 3C:
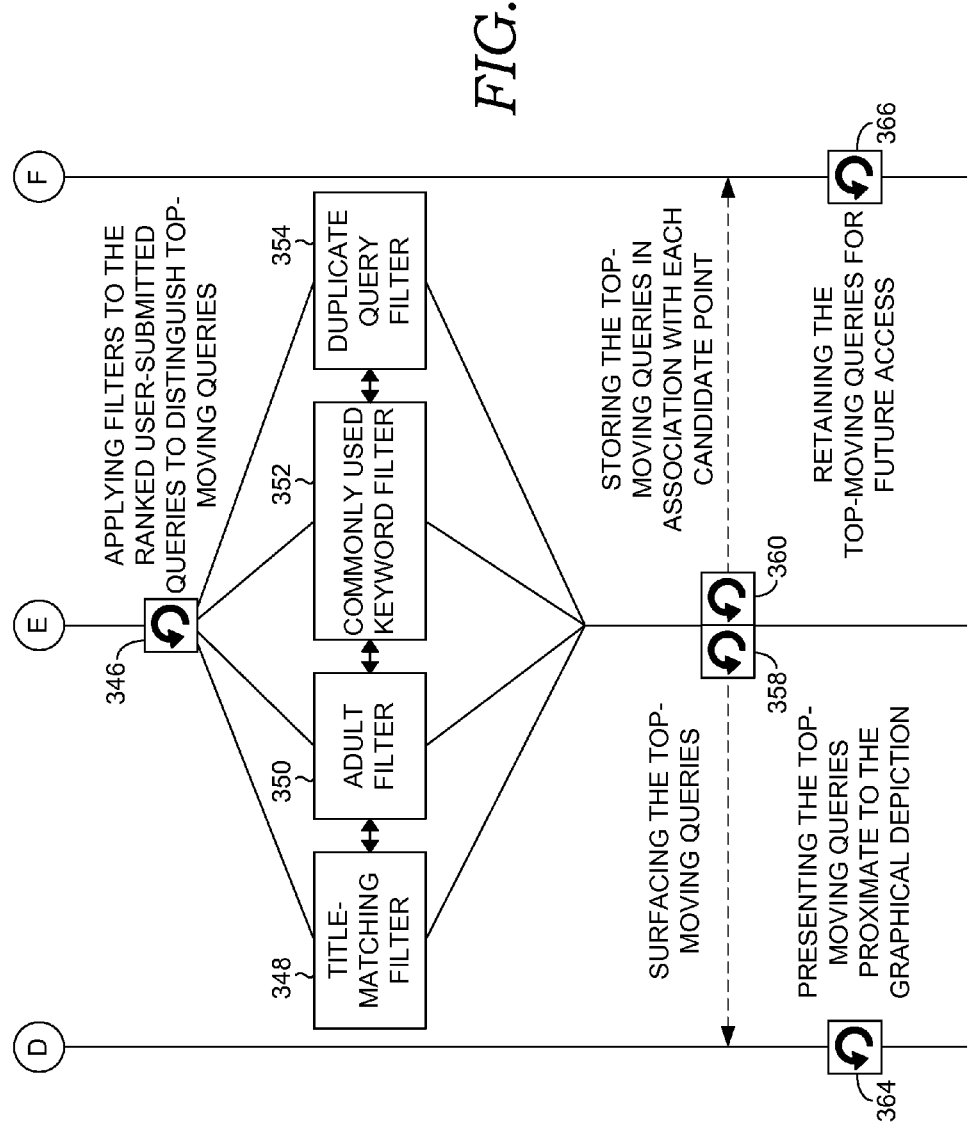

A selection process for automatically selecting candidate point(s) and for identifying top-moving queries associated with the candidate points will now be discussed with reference to FIGS. 3A-3C. In particular, FIGS. 3A-3C illustrate a diagrammatic flow chart that shows the selection process 300 implemented on suitable exemplary system architecture, in accordance with an embodiment of the present invention. It will be understood and appreciated by those of ordinary skill in the art that the exemplary system architecture shown in FIGS. 3A-3C is merely an example of one suitable computing environment and is not intended to suggest any limitation as to the scope of use or functionality of the present invention. Neither should the exemplary system architecture be interpreted as having any dependency or requirement related to any single component or combination of components illustrated therein.

Initially, the exemplary system architecture includes a search engine 305, a computing device 302, and a presentation device 324. Each of the search engine 305 and the computing device 302, shown in FIG. 3A, may take the form of various types of computing devices, such as, for example, the computing device 100 described above with reference to FIG. 1. By way of example only and not limitation, the search engine 305 and/or the computing device 302 may be a personal computer, desktop computer, laptop computer, consumer electronic device, handheld device (e.g., personal digital assistant), various servers, processing equipment, and the like. It should be noted, however, that the invention is not limited to implementation on such computing devices but may be implemented on any of a variety of different types of computing devices within the scope of embodiments of the present invention.

Further, in one instance, the search engine 305 is designed for searching for information on the Internet for gathering Internet search results in response to a user-submitted query that may be submitted through a website. In one embodiment, the search engine 305 includes one or more web crawlers that mine available data (e.g., newsgroups, databases, or open directories) accessible via the Internet and build a table containing web addresses along with the subject matter of web pages identified as the search results that are relevant to search terms within the user-submitted query. The search engine 305 may be accessed by Internet users through a web-browser application. Accordingly, the users may conduct an Internet search by submitting search terms at a query-entry area on a UI display presented on the web-browser application that is associated with the search engine 305. Further, the search engine 305 may then facilitate retrieving a set of search results (e.g., listing, table, ranked order of web addressed, and the like) that match the user's search terms.

In embodiments, the presentation device 324 is configured to render and/or present a user-interface (UI) display thereon. The presentation device 324, which is operably coupled to an output of the computing device 302, may be configured as any presentation component that is capable of presenting information to a user, such as a digital monitor, electronic display panel, touch-screen, analog set top box, plasma screen, and the like. In one exemplary embodiment, the presentation device 324 is configured to present graphical content, such as a UI display that includes a display area populated with search results. In another exemplary embodiment, the presentation device 324 is capable of rendering other forms of media (e.g., audio signals). In yet another exemplary embodiment, the presentation device 324 may present a graphical depiction of rank over time for an entity that is the subject of a user-submitted query, as more fully discussed below. In still another embodiment of the present invention, the presentation device 324 may render indicators of candidate points on the graphical depiction and a display area that surfaces top-moving queries, which correspond to the candidate points.

In embodiments, the computing device 302 includes a processing component 304 and a data store 306. The processing component 304 refers generally to a processor (e.g., CPU) that manages the sharing of the resources of the computing device 302 and provides programmers with an interface used to access those resources. In operation, the processing component 304 interprets data received from various sources (e.g., the search engine 305, the data store 306, a user 310) and provides meaningful results (e.g., candidate points, top-moving queries) that may be communicated to the presentation device 324 for surfacing in an appropriate UI display. As such, by way of example, the processing component 304 allows for processing of query, rank, time information to yield candidate points, and top-moving queries therefrom.

The data store 306 is generally configured to store information associated with user-submitted queries and/or data generated from the selection process, discussed below. In various embodiments, such information may include, without limitation, a graphical depiction of an entity, features of the graphical depiction (e.g., peak points, valley points, value of inclination angle, etc.), one or more candidate points, and/or top-moving queries. In addition, the data store 306 may be configured to be searchable for suitable access of stored information. For instance, the data store 306 may be searchable for one or more user-initiated queries associated with an entity selected for processing. It will be understood and appreciated by those of ordinary skill in the art that the information stored in the data store 306 may be configurable and may include any information relevant to the selection process, i.e., an item of information. The content and volume of such information are not intended to limit the scope of embodiments of the present invention in any way. Further, though illustrated as a single, independent component, the data store 306 may, in fact, be a plurality of databases, for instance, a database cluster, portions of which may reside on a computing device 302, the search engine 305, another external computing device (not shown), and/or any combination thereof.

This exemplary system architecture is but one example of a suitable environment that may be implemented to carry out aspects of the present invention and is not intended to suggest any limitation as to the scope of use or functionality of the invention. Neither should the illustrated exemplary system architecture be interpreted as having any dependency or requirement relating to any one or combination of the components 302, 304, 305, 306, and 324 as illustrated. In some embodiments, one or more of the components 304 and 302 may be implemented as stand-alone devices. In other embodiments, one or more of the components 305 and 324 may be integrated directly into the computing device 302. It will be understood by those of ordinary skill in the art that the components 302, 304, 305, 306, and 324 illustrated in FIG. 3A are exemplary in nature and in number and should not be construed as limiting.

Accordingly, any number of components may be employed to achieve the desired functionality within the scope of embodiments of the present invention. Although the various components of FIG. 3A are shown with lines for the sake of clarity, in reality, delineating various components is not so clear, and metaphorically, the lines would more accurately be grey or fuzzy. Further, although some components of FIG. 3A are depicted as single blocks, the depictions are exemplary in nature and in number and are not to be construed as limiting (e.g., although only one presentation device 324 is shown, many more may be communicatively coupled to the computing device 302).

Further, the components of the exemplary system architecture may be interconnected by any method known in the relevant field. For instance, the search engine 305 and the computing device 302 may be operably coupled via a distributed computing environment that includes multiple computing devices coupled with one another via one or more networks. In embodiments, the network (not shown) may include, without limitation, one or more local area networks (LANs) and/or wide area networks (WANs). Such networking environments are commonplace in offices, enterprise-wide computer networks, intranets, and the Internet. Accordingly, the network is not further described herein.

In operation, the components 302, 304, 305, 306, and 324 are designed to perform a process for selecting candidate points to expose on the graphical depiction and/or aggregating top-moving queries to present that are primarily responsible for the candidate points. Initially, a user 310 may provide a user-initiated selection 308 of a particular entity and a time frame. As discussed above, the entity could be a person, a corporation, a government unit, a product, a sports team, a geographic location, etc. The selection may be entered at a user-interface (UI) display associated with a web-browser or at any other interface for communicating with the processing component 304. As discussed above, the time frame generally refers to a period of time in which previous user-submitted queries referencing the selected entity are to be retrieved. Typically, the time frame is divided into temporal increments for purposes of collecting the previous queries provided by users of the search engine 305, and for purposes of comparing a number of the queries against a number of queries collected for other entities.

Upon receiving the selection 308, the processing component 304 may execute procedure 314 for retrieving user-submitted queries 320 that reference the selected entity, in accordance with the selection 308. In embodiments, retrieving the appropriate user-submitted queries 320 involves, in part, transmitting a request 312 to the search engine 305 and/or the data store 306. That is, the request 312 may include information that facilitates locating corresponding queries 320 residing at the search engine 305, the data store 306, or a combination thereof, for building a graphical representation of the selected entity. In embodiments, the queries may be located in a query log accessible via the search engine 305. Generally, the query log relates to stored data describing Internet searches submitted to the search engine 305. Examples of data stored in the query log include the search terms that comprise the user-initiated queries submitted for each Internet search, the search results presented, the search results selected by the user, and other online search-related information.

Upon retrieving the user-submitted queries 320, procedure 322 for providing a graphical depiction of a rank of the selected entity over a time frame may be performed. As used herein, the term "rank" is not meant to be limiting but generally represents a relative popularity of the entity in relation to a plurality of entities of a predefined category. In one instance, the rank is determined by comparing the user-submitted queries 320 for the selected entity against other queries collected at a search engine 305 (e.g., being stored in the query log). In another instance, the entities may be sorted into a predefined category that includes substantially comparable entities grouped according to at least one of people, sports teams, products, geographic locations, music, companies, tools, or types of entertainers. The predefined categories may be used, in part, for tailoring the ranking procedure for the selected entity to a comparison of the selected entity against similarly classed entities, thereby generating a meaningful rank of entities. Further, in some instances, a filter is employed to distinguish between legitimate Internet searches submitted by individual users and spam Internet searches submitted by a computer application with any purpose other than finding a relevant website (e.g., increasing traffic to a website, increasing the sites importance within the search engine rankings, increasing the popularity score of an entity). These spam Internet searches may be removed from consideration when deriving a rank of the selected entity from the comparison of user-submitted queries 320.

For example, if a first entity is the object of 20 Internet searches it will be ranked higher than a second entity that is the object of 10 Internet searches during the same temporal increment. In one embodiment, the entity is the object of an Internet search if the search terms within the user-initiated query include an entity descriptor that identifies one or more entities. That is, an entity descriptor may be any word or phrase commonly used to identify the entity. For example, entity descriptors for Jennifer Lopez could include "Jennifer Lopez," "Jlo," or a common misspelling such as "Jennifer Lopezz."

Incident to deriving the rank of the selected entity for temporal increments over the time frame, a graphical depiction of the rank may be generated. As used herein, the phrase "graphical depiction" is not meant to be limiting, but may encompass any graphical representation of trends of the rank of the selected entity (e.g., line graph, bar graph, scatter plot, and the like). In an exemplary embodiment, the graphical depiction intuitively illustrates movements in popularity rank of an entity over time.

Although various embodiments of methods for determining a rank of the selected entity and generating a graphical depiction of the rank over the time frame are discussed hereinabove, it should be understood and appreciated by those of ordinary skill in the art that other types of suitable methods for calculating an ordering or plotting a graph may be used, and that embodiments of the present invention are not limited to those processes explicitly described. For instance, in one embodiment of the present invention, processes for ranking and drawing the graphical depiction are allocated to individual components. The details of these components are set forth in U.S. patent application Ser. No. 12/013,275, filed Jan. 11, 2008, entitled DETERMINING ENTITY POPULARITY USING SEARCH QUERIES, the entire disclosure of which is herein incorporated by reference.

Referring now to FIG. 3B, a selection procedure 326 for identifying points on the graphical depiction is automatically initiated. In embodiments, the identified points are associated with positive movements of rank of the selected entity as exemplified by the graphical depiction. In one instance, the selection procedure 326 initially includes one or more of the following steps, in no particular order: identifying locations on the graphical depiction between adjacent inclines and declines; recording the identified locations as either peak points or valley points based on whether the ranking associated with a location is relatively high or low; ascertaining the rank of the peak points and the valley points; and deriving slope values based on an angle of inclination of the inclines illustrated on the graphical depiction, where the inclines may flow from a valley point to a peak point. In one embodiment, a peak point may be identified by determining a location on a trend-line that the entity's rank increases and then decreases.

Upon identifying the rank of the peak points and the deriving the slope values, one or more candidate points may be selected for surfacing on the graphical depiction. In a first embodiment, selecting the candidate points includes, but is not limited to, comparing the rank associated with each of the peak points against each other to determine a highest ranked peak point and identifying the highest ranked peak point on the graphical depiction as one of the candidate points. If two or more of the peak points qualify as a highest peak point during selection, a tie-breaking heuristic 328 is applied to determine which of the highest ranked peak points to identify as a candidate point. In one instance, the tie-breaking heuristic 328 involves, at least, the following steps: determining that a plurality of the peak points share the highest ranking; tracing backward along the graphical depiction to ascertain a valley point immediately preceding each of the plurality of peak points; and calculating a rank differential utilizing the ascertained valley point. In particular, calculating the rank differential includes determining a height difference, or movement in rank, between each of the valley points and an immediately following highest ranked peak point. The peak point, of the highest ranked peak points, that is associated with a largest rank differential may be identified as a candidate point. That is, the peak point on the graphical depiction having a greatest positive movement in the rank with respect to a precedent valley point is captured. Accordingly, this candidate point generally represents a high level of popularity for the selected entity within a time frame that also occurs at the culmination of a substantial upward trend in rank.

In another instance, if the tie-breaking heuristic 328 above does not distinguish one of the highest ranked peak points from the others upon comparing rank differentials, the most recent of the highest ranked peak points is selected. Selecting the most recent peak point typically refers to picking the peak point, of the highest ranked peak points, that occurred the latest in the scope of time encompassed by the time frame of the graphical depiction. Upon selecting the most recent peak point, it is identified as a candidate point.

Incident to identifying the peak point as a candidate point, a procedure 330 for determining whether a predefined number of candidate points are selected is performed. Determining whether a predefined number of candidate points are selected involves enumerating the peak points identified as candidate points and comparing that number to the predefined number. In embodiments, the predefined number may be established by an administrator or automatically computed by a program and is based on one or a combination of the following factors: the length of time covered by the time frame; the shape of the graphical depiction, the type and number of features exhibited by the graphical depiction; the number of user-initiated queries that support each temporal increment of the graphical depiction; or the span of historic data collected for the selected entity available at the query log. If the number of candidate points does not meet the predefined number of candidate points, then the procedures 326, 328, and 330 are repeated.

Upon determining that the number of predefined candidate points is not met, a second embodiment of implementing the selection procedure 326 to identify candidate points may be performed. This second embodiment of selecting a candidate point includes, in part, the following steps: identifying a peak point that is latest in time within a scope of the time frame; and ascertaining whether the slope value of an incline preceding the latest peak point is greater than a predefined threshold slope. In a particular embodiment, the process of ascertaining includes deriving the slope value of an incline that culminates at the latest peak from the inclination angle of the incline. The predefined value may be established to ensure sufficient positive movement of the preceding latest peak point. By way of example only, the predefined value may be 0.2. Accordingly, if the slope value meets or exceeds the predefined value, the latest peak point is considered an indicator of a rise in the selected entity's popularity, thus, identified as one of the candidate points.

In a third embodiment of implementing the selection procedure 326, selecting the candidate points to feature on a graphical depiction includes identifying a remainder of the peak points that are not identified as a candidate point, and comparing the slope values of the inclines adjacent to the remaining peak points. Based on the comparison, a peak point, of the remaining peak points, that is adjacent to an incline having a greatest slope value may be identified as a candidate point.

Upon identifying candidate points when implementing at least one of the first, second, or third embodiments of the selection procedure 326, a filtering heuristic may be applied, as indicated at procedure 328. In addition to the steps performed by the tie-breaking heuristic discussed above, the filtering heuristic may further filter from the candidate points redundant or unsupported peak points. In an exemplary embodiment of filtering redundant candidate points, an analysis is performed to determine if two peak points selected as candidate points are within a threshold number of temporal increments of each other (i.e., occur within a certain period of time). If so, the peak point that has the highest rank is retained while the other peak point is ignored (i.e., removed from the set of candidate points). By removing peak points that are proximate in time (e.g., within a week), the filtered candidate points may represent disparate rises in the selected entities that are associated with disparate reasons for the rises. By way of example only, if several candidate points are identified within April 2008, which is the release of the movie "21" starring Kevin Spacey, the filtering heuristic 328 may retain only one of those candidate points. Accordingly, each candidate point associated with the actor Kevin Spacey will represent a different interesting event (e.g., movie, press release, and the like) that caused a rise in his popularity.

In an exemplary embodiment of filtering unsupported candidate points, an analysis is preformed to determine if a certain number of user-initiated queries, which have common search terms, support the peak points selected as candidate points. If not, the peak points that have minimal supporting user-initiated queries (e.g., below 3 occurrences of queries with common search terms) are ineligible to be selected as candidate points. By ignoring peak points that do not have a sufficient sample size of queries, those remaining peak points identified as candidate points are associated with a meaningful set of queries that likely predict why the selected entity rose in popularity. That is, the filtering heuristic 328 is capable of recognizing that a requisite number of common search terms within the queries to sufficiently explain the peak points is not attained.

With reference to the procedure 330, the first, second, and third embodiments for identifying candidate points may be recursively implemented to identify peak points of the remaining peak points as candidate points until a predefined number of candidate points are accumulated. Accordingly, the predefined number may be arrived upon after implementing any one or combination of the embodiments. In one example, the predefined number may be met after implementing the first and second embodiments, in no particular order. In another example, the first, second, and third embodiments may be implemented, and the third embodiment repeated a plurality of times until a predefined number of candidate points is met. If there are there are not enough peak points in the graph graphical depiction to satisfy the predefined number, a midpoint between a valley point and a peak point may be selected as a candidate point if the slope value of the precedent incline is sufficiently high. If there are not enough peak points and insufficient midpoints, then the expectation to reach the predefined number may be excepted.

Upon identifying a predefined number of candidate points, the candidate points may be surfaced at the presentation device 324 during procedure 334. In one instance, surfacing includes presenting, at a user-interface (UI) display, an indicator of each of the candidate points on the graphical depiction. As illustrated by procedure 338, the indicator may be an icon that overlays the peak points on the trend-line of the graphical depiction that corresponds to the identified candidate points. The process of surfacing is more fully discussed above with reference to FIG. 2. In cooperation with, or in place of, surfacing the candidate points, procedure 336 may be executed to store the candidate points at the data store 306. In embodiments, the candidate points may be stored in association with a corresponding peak point, with a ranking in popularity of the selected entity at the corresponding peak point, with a temporal increment at which the corresponding peak point resides, or any combination thereof. Once stored at the data store 306, the candidate points may be retained for future access and are searchable via the associated information discussed above, as indicated at procedure 342 of FIG. 3B.

Upon identifying the candidate points, a selection procedure 340 may be invoked to determine which of the user-submitted queries to surface for each of the candidate points. Accordingly, the selection procedure 340 is configured, in part, to determine the reason for an increased rank of the selected entity associated with each of the peak points chosen as the candidate points. The explanation for the candidate points may be attained by evaluating the user-initiated queries (e.g., Internet searches), containing search terms referencing the selected entity. By way of example only, in a case where Brad Pitt is the selected entity, if the search term "Mr. and Mrs. Smith" appears frequently within the collected user-initiated queries that support a particular candidate point, the selection procedure 340 may determine that the explanation for rise in Brad Pitt's popularity surrounding that candidate point relates to the release of "Mr. and Mrs. Smith." Although a rise in popularity is discussed above as occurring contemporaneously with the release of a movie, the explanation of a candidate point may relate to any interesting event that is searchable on the Internet, including new articles, press releases, gaming events, and the like.

In embodiments, the selection procedure 340 includes assigning the retrieved user-submitted queries to query groups according to the search terms that are common to the retrieved user-submitted queries, and enumerating the user-submitted queries assigned to each of the query groups. In embodiments, enumerating includes counting the number of user-submitted queries in each of the query groups to determine the most populated query group, the second most populated query group, and so on. Typically, those query groups associated with the common search terms that occur less than a predefined threshold are removed from consideration (e.g., ignoring queries that repeated less than three times).

As indicated by procedure 344, those remaining query groups are ranked based on the enumeration. For instance, the most populated query group may be ranked highest. Accordingly, the query groups associated with common search terms that occur frequently are ranked highly. In one embodiment, ranking the query groups based on the enumeration includes, at least, the following steps: assigning previously received user-submitted queries to prior query groups according to the search terms that are common to the previously received user-submitted queries; enumerating the previously received user-submitted queries assigned to each of the prior query groups; and mapping the query groups (discussed above) to the prior query groups. The process of mapping includes comparing the common search terms of each query group against the common search terms of each prior query group to determine a match.

Upon establishing a mapping scheme, ranking the query groups may further include calculating a ratio of a number of the user-submitted queries in one query group over a number of the previously-received user-submitted queries in a prior query group that is mapped to that query group. The query score may be calculated by multiplying the number of the user-submitted queries in the query group by the ratio. This calculation may be expressed by the following formula:

$$QueryScore = \frac{(Score1 + 1)}{(Score2 + 1)} \times Score1$$

As such, the formula is a computation of the query score for a particular query group where Score1 represents a number of user-initiated queries in a query group (e.g., today's query count) and Score2 represents a number of previously-received user-submitted queries in a prior query group (e.g., yesterday's query count) that is mapped to the query group. The formula also includes adding a "1" to each of the scores in the ratio to ensure the denominator is not zero. Further, upon determining a query score, the query groups may be ranked by a query score associated therewith.

Referring now to FIG. 3C, upon establishing the ranking of the query groups, a procedure 346 is initiated to apply one or more filters to the ranked query groups in order to identify the top-moving queries from the query groups. In a first embodiment, applying one or more filters includes invoking a title-matching filter 348. Generally, the title-matching filter 348 is configured to identify and remove from consideration those query groups with queries therein that include search terms which are substantially the same as the name/title of the selected entity. For instance, in the case where a query group includes queries with search terms indicating Kevin Spacey, if the search terms consist of "K Spacey," the query group will be removed from consideration. In one instance, applying the title-matching filter 348 includes determining that the common search terms associated with a query group are substantially comparable to a title of the entity, and excluding the comparable common search terms from consideration for identification as a top-moving query.

In a second embodiment, applying one or more filters includes invoking an adult filter 350. Generally, the adult filter 350 is configured to identify and remove from consideration those query groups with queries therein that include search terms which are recognized as profane words, hate speech, or otherwise objectionable language. If one or more of the search terms are identified as objectionable, the entire query group will be removed from consideration. In one instance, applying the adult filter includes accessing a manifest of phrases and terms designated as objectionable (e.g., local listing on the data store 306, remote database at the search engine 305, etc.), comparing the common search terms associated with the ranked query groups against the objectionable phrases and terms to detect a match, and excluding the matching common search terms from consideration for identification as a top-moving query.

In a third embodiment, applying one or more filters includes invoking a commonly used keyword filter 352. Generally, the commonly used keyword filter 352 is configured to identify and remove from consideration those query groups with queries therein that include search terms which are uninteresting. In one instance, uninteresting search terms are terms that are not unique to an explanation of why a rise in a selected entity's popularity occurred (i.e., why the peak point in the graphical depiction of rank came about). Examples of uninteresting or non-distinct search terms include "photos," "pictures," "news," "video," and other words that may otherwise be unrelated to the event that caused a peak point. In one instance, applying the commonly used keyword filter 352 includes accessing a manifest of commonly used keywords, comparing the common search terms associated with the ranked query groups against the commonly used keywords to detect a match, and excluding the matching common search terms from consideration for identification as a top-moving query. Upon excluding the common search term(s), the query may be cycled through the title-matching filter 348 to determine whether the remaining search terms are substantially the same as the name/title of the selected entity.

In a fourth embodiment, applying one or more filters includes invoking a duplicate query filter 354. Generally, the duplicate query filter 354 is configured to identify and remove from consideration those query groups with queries therein that include search terms which are shared by queries in other query groups. Accordingly, repetition of search terms contained in queries selected as top-moving queries can be avoided. In one instance, applying the duplicate query filter 354 includes comparing the common search terms identified as top-moving queries against an unselected common search term. Based on the comparison, an edit distance between the common search terms identified as the one or more top-moving queries and the unselected common search term is determined. If the edit distance is below a predefined threshold, the unselected common search term is removed from consideration for identification as a top-moving query. In one embodiment, the edit distance refers to a minimum number of discrete changes (e.g., add a letter, subtract a letter, or replace a letter) that should be performed to modify one query into another. In another embodiment, identifying queries that have search terms which are duplicative includes truncating the search terms of one query and successively comparing the truncated search terms against truncated search terms of another query. In yet another embodiment, comparing search terms identified as top-moving queries against an unselected common search term includes extracting distinct keywords from a query selected as a top-moving query, temporarily writing the distinct keywords to a filter list, and interrogating the filter list with search terms from a query being subsequently considered for selection as a top-moving query.

Although the procedure 346 is described as applying four different embodiments of filters to the ranked user-submitted queries to distinguish top-moving queries therefrom, it should be understood and appreciated by those of ordinary skill in the art that other types of suitable filters that distill search terms from a plurality of queries, which are responsible for generating a rise in popularity of a selected entity, may be used, and that embodiments of the present invention are not limited to those filters 348, 350, 352, and 354 described herein. Further, one or more of the filters 348, 350, 352, 354, and others not described may be implemented in any order or combination. For instance, the title-matching filter 348 may be initially applied, the commonly used keyword filter 352 may be applied next, and, if common words are recognized and extracted from the subject query, the title-matching filter 348 may be reapplied.

The identified top-moving queries may be surfaced at the presentation device 324, utilizing procedure 358, where the top-moving queries are presented to a user. In one instance, presentation includes surfacing a representation of the queries selected as top-moving queries in a display area on a graphical user-interface (GUI). By way of example only, the display area may be a static window proximate to the graphical representation of rank, or may be a pop-up window that is surfaced upon hovering over a candidate point with a cursor tool. In another instance, presentation includes communicating the top-moving queries to a user in any manner known in the relevant field, such as broadcasting the queries in an auditory signal from an audio device.

Also, or in place of surfacing the top-moving queries with procedure 358, the top-moving queries may be stored at the data store 306, utilizing procedure 360. Storing may include writing the top-moving queries to any database or server operably coupled to the processing component 304, and may further include storing pertinent information in association with the top-moving queries, as indicated at process 366 of FIG. 3C. In embodiments, the pertinent information may include at least one of the following: the candidate point which is supported by the top-moving queries, the temporal increment on which the candidate point is located, and the rank assigned to each of the top-moving queries. Accordingly, the top-moving queries may be surfaced in any order that reflects the ranking assigned to the queries, as more fully discussed above with reference to procedure 344 of FIG. 3B.

Referring next to FIG. 4, a flow diagram showing an exemplary overall method for identifying one or more candidate point(s) based on a ranking of an entity over time, in accordance with an embodiment of the present invention, is shown and designated generally as reference numeral 400. Initially, as indicated at block 405, indication that a user selected an entity to be the subject of a graphical depiction is received. In addition, a time frame may be received from the user, where time frame is a span of hours, days, weeks, etc., over which the graphical depiction is generated. As indicated at block 410, a graphical depiction of a ranking of the entity over the time frame is provided by a processor (e.g., utilizing the processing component 304 of FIG. 3A). In one instance, the rank of the selected entity is based on its comparative popularity, as exhibited by web queries, in comparison with related entities in a predefined category.

A selection procedure may be commenced, either automatically or manually, to identify points on the graphical depiction associated with positive movements in the rank of the selected entity, as depicted at block 415. Typically, the positive movements are exposed in a visual representation of the graphical depiction surfaced at a UI display presented on a presentation device (e.g., utilizing the presentation device 324 of FIG. 3A). In embodiments, the selection procedure includes, but is not limited to the following steps: identifying temporal increments between adjacent inclines and declines as either peak points or valley points (see block 425); ascertaining a rank associated with the peak points based on the ranking (see block 430); deriving a slope value from an angle of inclination of inclines on the graphical depiction (see block 435); and selecting one or more candidate points to feature based on the ranked peak points and the slope values (see block 440).

The process of selecting candidate points may encompass various steps and algorithmic procedures applied to the features of the graphical depiction. In an exemplary embodiment, the selection process includes, at least, the following steps, in no particular order: determining a highest ranked peak point to promote to a candidate point (see block 445); identifying a peak point that is latest in time within the time frame to promote to a candidate point (see block 450); and selecting for promotion a peak point located at a culmination of an incline that has a precedent incline with the largest slope value (see block 455). As depicted at block 460, the step of selecting a peak point adjacent to an incline with a largest slop value is recursively repeated until a predefined number of candidate points are selected. Upon selecting candidate points to feature as part of the procedure for identifying points on the graphical depiction, indicators representing the selected points of the graphical depiction are surfaced at a UI display, as indicated at block 420 of FIG. 4.

Figure 5:
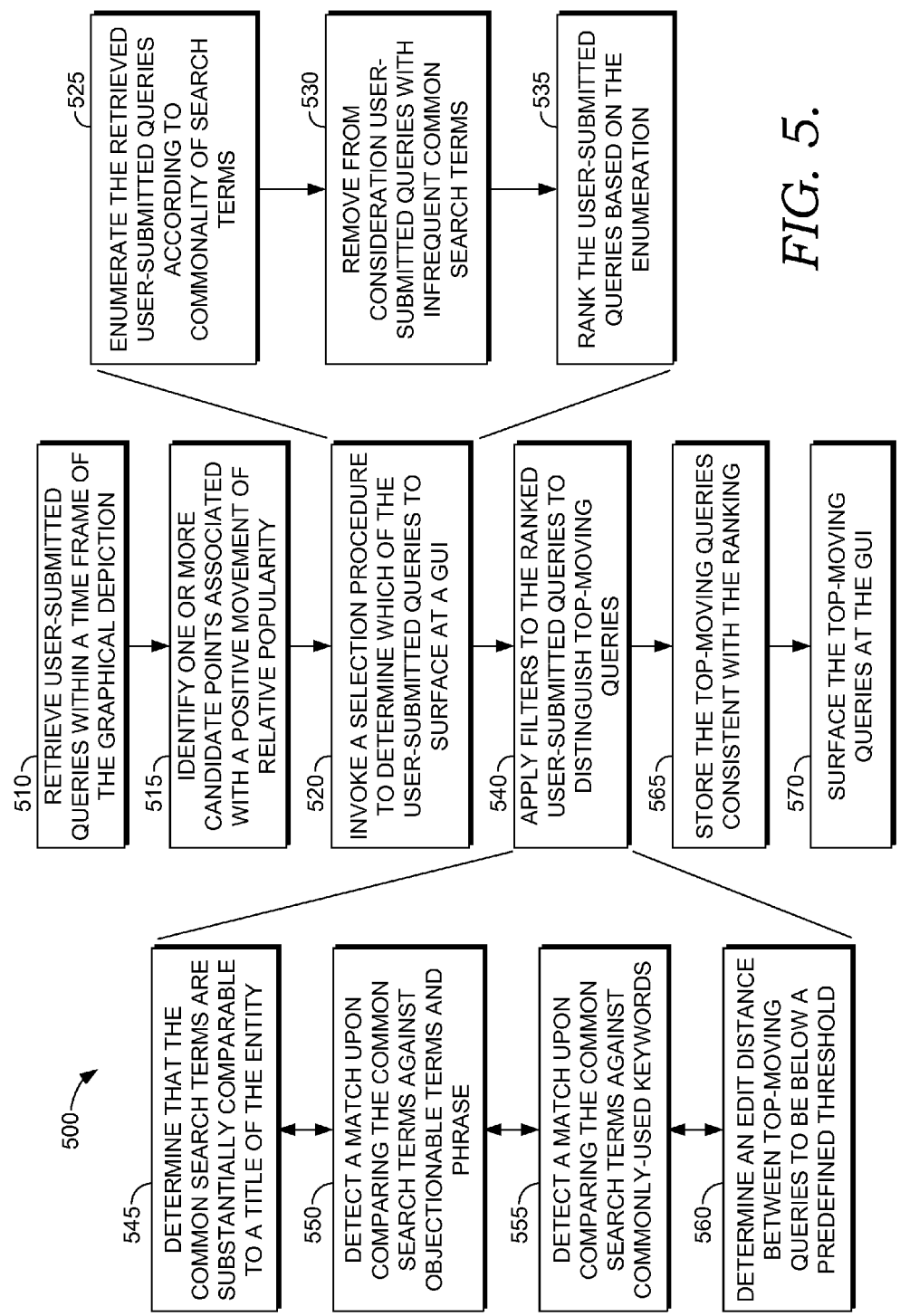
FIG. 5 is a flow diagram illustrating an overall method for selecting top-moving queries from user-submitted queries associated with a candidate point, in accordance with an embodiment of the present invention.

Turning now to FIG. 5, a flow diagram is shown that illustrates an overall method 500 for selecting top-moving queries from user-submitted queries associated with a candidate point, in accordance with an embodiment of the present invention. Initially, user-submitted queries are retrieved within a time frame of a graphical depiction of a rank of an entity, as depicted at block 510. As depicted at block 515, one or more candidate points are identified from the graphical depiction. In one instance, identifying the candidate points includes locating points at a peak of a positive movement in rank of the entity (e.g., rise in the entity's relative popularity compared to related entities). As indicated at block 520, a selection procedure is invoked to determine which of the user-submitted queries to surface at a GUI presented at a display device. In an exemplary embodiment, the selection procedure includes, in part, the following steps: enumerating the retrieved user-submitted queries according to commonality of search terms (see block 525); removing from consideration user-submitted queries with infrequent search terms (see block 530); and ranking the user-submitted queries based on the enumeration (see block 535).

Upon, ranking the user-submitted queries, filters may be applied to the ranked queries to distinguish top-moving queries therefrom, as indicated at block 540. Applying the filters may be accomplished by performing one or more of the following steps, in no particular order: filtering common search terms upon determining that the common search terms are substantially comparable to a title of the entity (see block 545); filtering terms or phrases upon detecting a match between the terms or phrases against objectionable terms and phrases (see block 550); filtering common search terms upon detecting a match when comparing the common search terms against commonly used search terms (see block 555); and filtering search terms that are similar to search terms previously selected as top-moving queries (see block 560). In one instance, filtering search terms that are similar to search terms previously selected as top-moving queries includes determining that an edit distance between the search terms within queries selected as the top-moving queries and the search terms within a subject query is below a predefined threshold.

Upon applying the filter(s) to the user-initiated queries, the remaining user-initiated queries that are highly ranked are identified as the top-moving queries. These top-moving queries generally help explain why a rise in rank or popularity of an entity occurred. These identified top-moving queries may be stored consistent with the ranking, as indicated at block 565, and/or surfaced at the GUI, as indicated at block 570.

With reference to FIGS. 6-10, illustrative screen displays of exemplary user interfaces for presenting indication(s) of candidate point(s) on a graphical depiction and surfacing top-moving queries associated with the candidate point(s) are shown, in accordance with an embodiment of the present invention. Initially, with reference to FIG. 6, an exemplary user interface 600 is shown. The user interface 600 includes a query-entry area in which an entity "Britney Spears" 610 is provided. Other entities within a predefined category of the entity 610 are presented in a listing 690. The listing 610 represents a rank of relative popularity of the entity in relation to a plurality of entities of the predefined category.

A graphical depiction 640 of rank 620 of the selected entity 610 is shown. A time frame of the graphical depiction 640 may be picked from predetermined, selectable options 630. In this instance the chosen time frame is one month. The graphical depiction 640 includes three candidate points 695 derived from features of the graphical depiction 640. The candidate points 695 are surfaced with a numeric icon that corresponds with a numeric icon in a list of top-moving queries 650. In particular, top-moving queries 680 support a candidate point of numeric icon "1" 660, and help explain why Britney Spears attained a rise in popularity during a temporal increment of Mar. 1, 2008.

Figure 6:
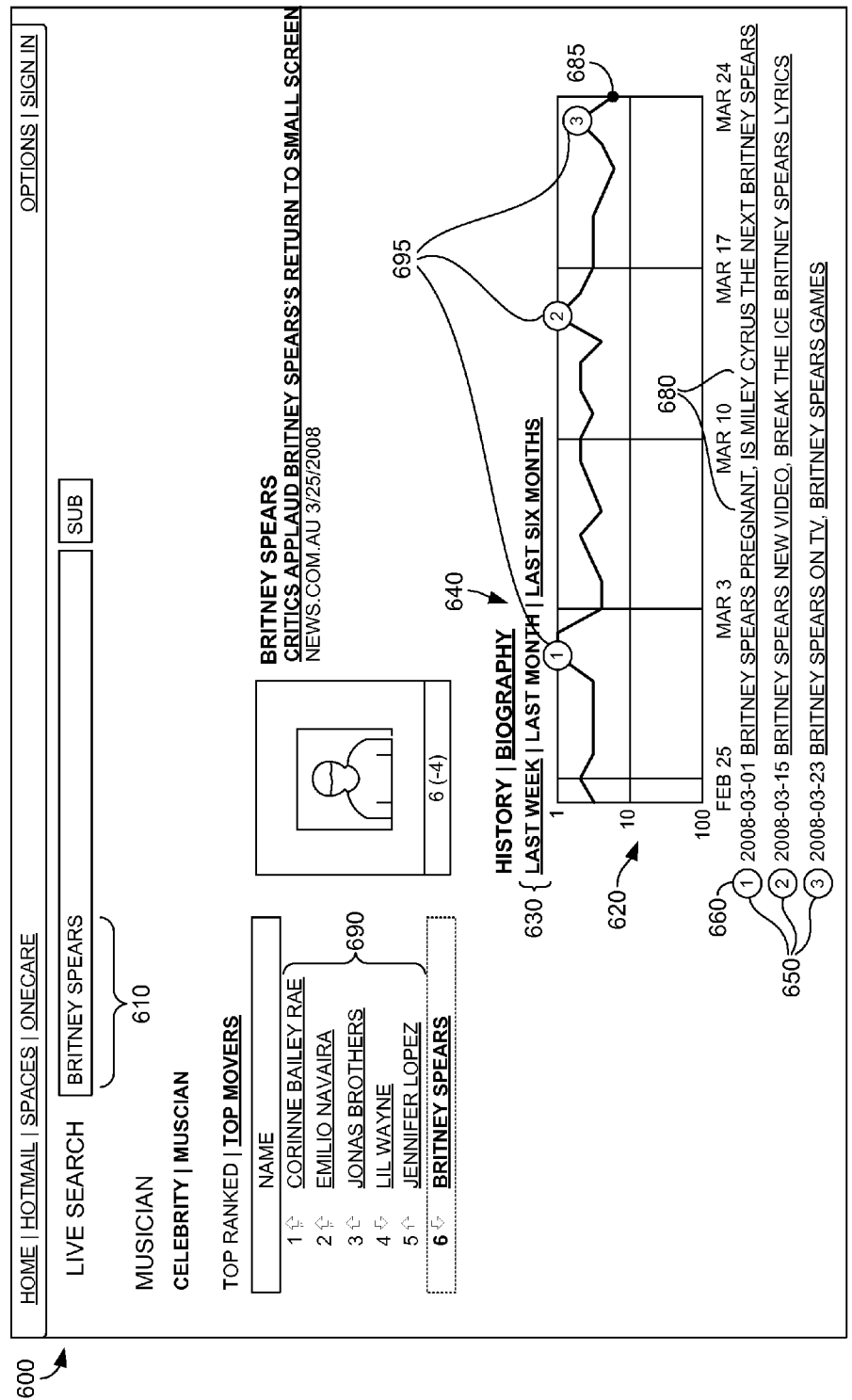
FIGS. 6-10 are illustrative screen displays of exemplary user interfaces for presenting indication(s) of candidate point(s) on a graphical depiction and surfacing top-moving queries associated with the candidate point(s), in accordance with an embodiment of the present invention.

As can be seen in FIG. 6, each of the candidate points 695 overlay a highly ranked peak point on the graphical depiction 640. Accordingly, these candidate points 695 mark temporal increments (e.g., March 1$^{st}$, March 15$^{th}$, and March 23$^{rd}$) within the chosen time frame where the selected entity 610 is most popular. As discussed previously, the selection procedure for finding candidate points often selects a point latest in the time frame 685 as a candidate point. However, because the point latest in time 685 in this instance is not associated with a rise in popularity (e.g., an incline with an angle of inclination greater than a predefined threshold), the point latest in time 685 is not selected as one of the candidate points 695.

Figure 7:
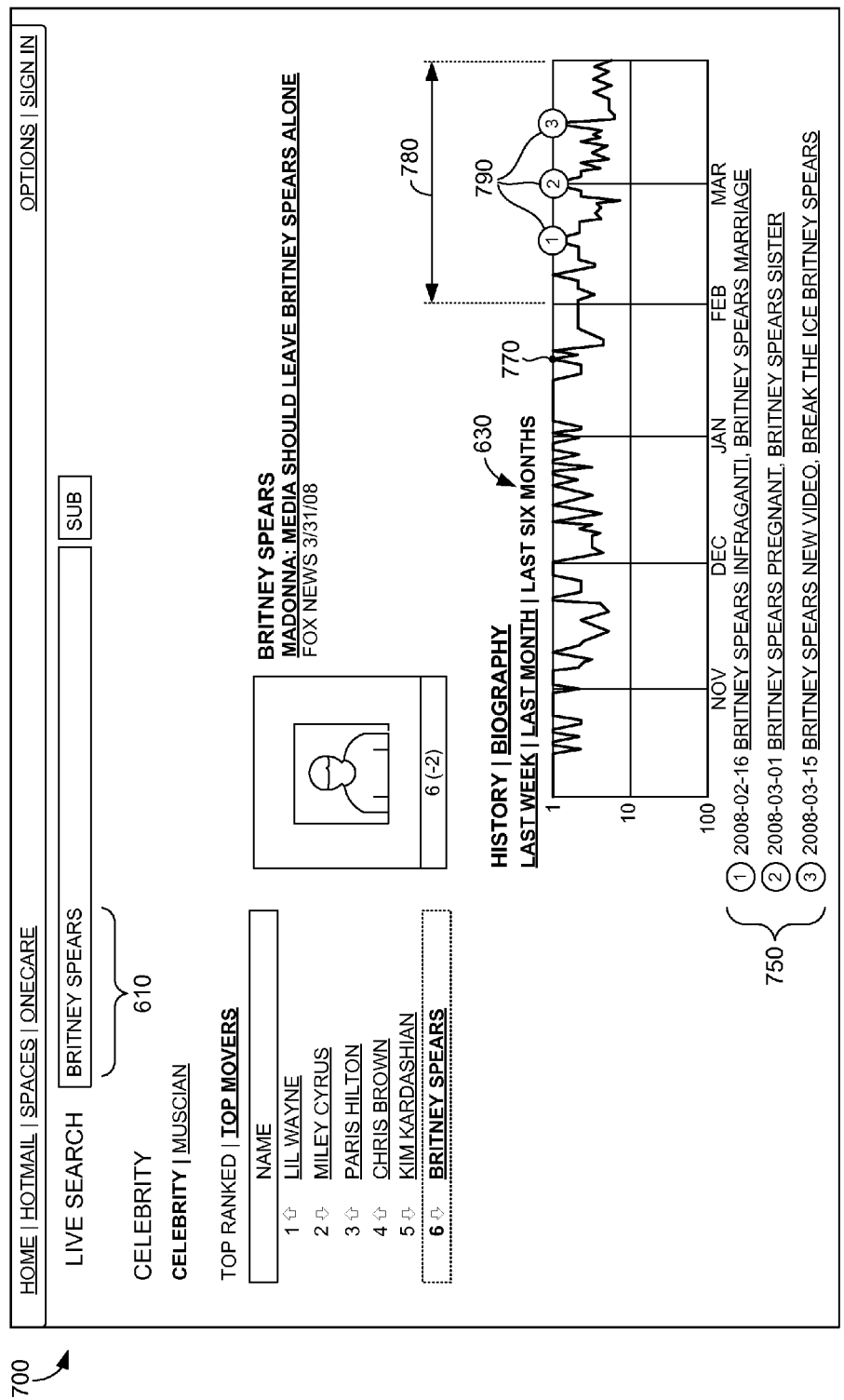

Turning now to FIG. 7, an exemplary user interface 700 is shown. The user interface 700 includes a query-entry area in which the entity "Britney Spears" 610 is again provided. In this user interface 700, in contrast to the user interface 600 of FIG. 6, a time frame of six months is selected from the predetermined, selectable options 630. A graphical depiction 770 is rendered within the six-month time frame, where the graphical depiction 770 includes a large number of peak points. Candidate points 790 are selected from the peak points utilizing the selection procedure discussed above. As such, those highest ranked peak points that are latest in time 780 within the time frame are identified as the peak points 790. Further, similar to the user interface 600 of FIG. 6, top-moving queries 750 that support the candidate points 790 are surfaced at the user interface 700 of FIG. 7.

Figure 8:
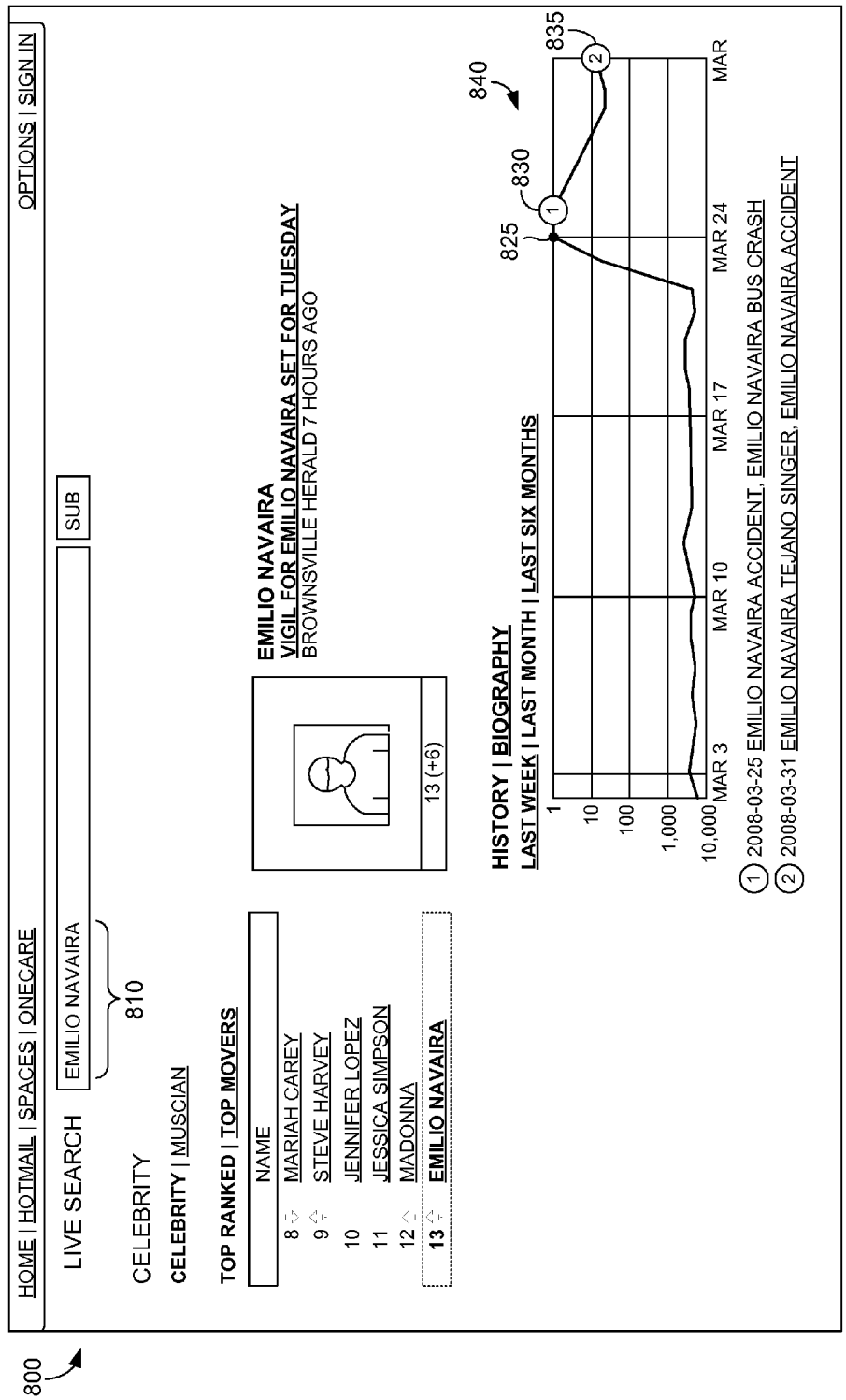

Turning now to FIG. 8, an exemplary user interface 800 is shown. The user interface 800 includes a query-entry area 810 in which the entity "Emilio Navaira" is provided. In this user interface 800, a graphical depiction 840 is rendered within a one-month time frame, where the graphical depiction 840 includes few highly ranked peak points. Accordingly, a predetermined number of candidate points 830 and 835 to surface on the graphical depiction 840 may be adjusted to a lower number based on the shape of the graphical depiction 840. Utilizing the selection procedure discussed above, the candidate point 830 is selected from a plateau of peak points, including peak point 825, by identifying a peak point that is latest in time and promoting that peak point to the candidate point 830. Candidate point 835 is selected because it is a latest point on the time frame of which the graphical depiction 840 is rendered and because the graphical depiction 840 exhibits a rise in Emilio Navaira's popularity immediately prior to the latest point.

Figure 9:
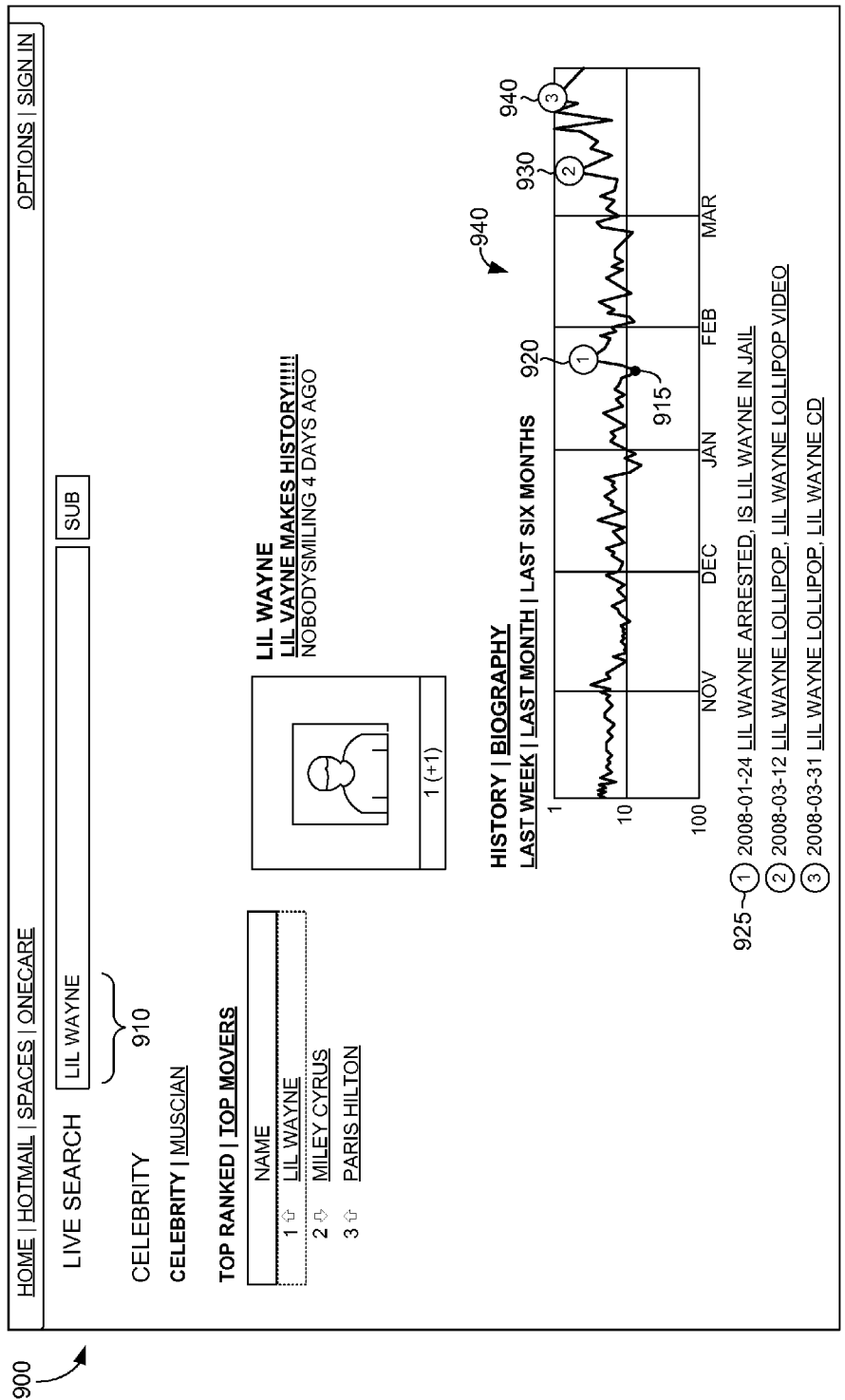

With reference to FIG. 9, user interface 900 is illustrated that includes a graphical depiction 940 of a selected entity's (Lil Wayne) 910 rank over a time frame. As depicted, candidate points 930 and 940 are selected from latest peak points on the graphical depiction 840, utilizing the selection procedure discussed above. A third candidate point 920 is selected because it resides at a culmination of a large positive movement in Lil Wayne's rank, with respect to other musicians. In particular there is a significant improvement from valley point 915 to a peak point selected as the candidate point 920. Accordingly, top-moving queries 925 that explain this abrupt rise in popularity are likely of interest to users and are surfaced in proximity to the graphical depiction 940.

Figure 10:
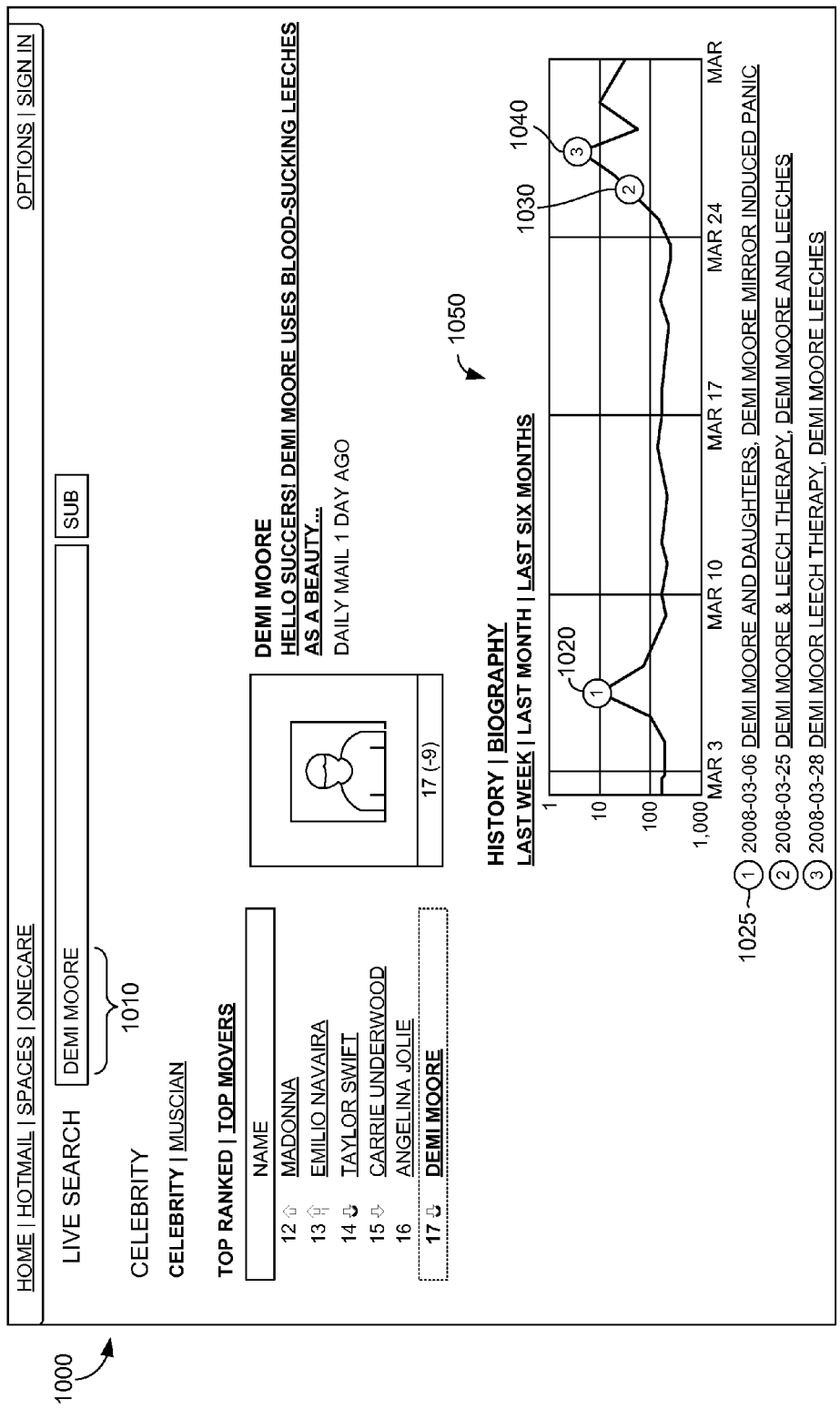

Turning now to FIG. 10, user interface 1000 is illustrated that includes a graphical depiction 1050 of a selected entity's (Demi Moore) 1010 rank over a time frame. As depicted, candidate points 1040 and 1020 are selected from highest peak points on the graphical depiction 840, utilizing the selection procedure discussed above. A third candidate point 1030 is selected because it resides at a large positive movement in Demi Moore's rank, with respect to other actors. In particular, because the positive movement occurs over a substantial time period, which is greater than time periods related to other positive movements, a point on an incline (i.e., not a peak point) is selected as the candidate point 1030, utilizing the selection procedure discussed above. Accordingly, top-moving queries 1025 that explain this substantial rise in popularity are likely of interest to users and are surfaced in proximity to the graphical depiction 1050.

Figure 11:
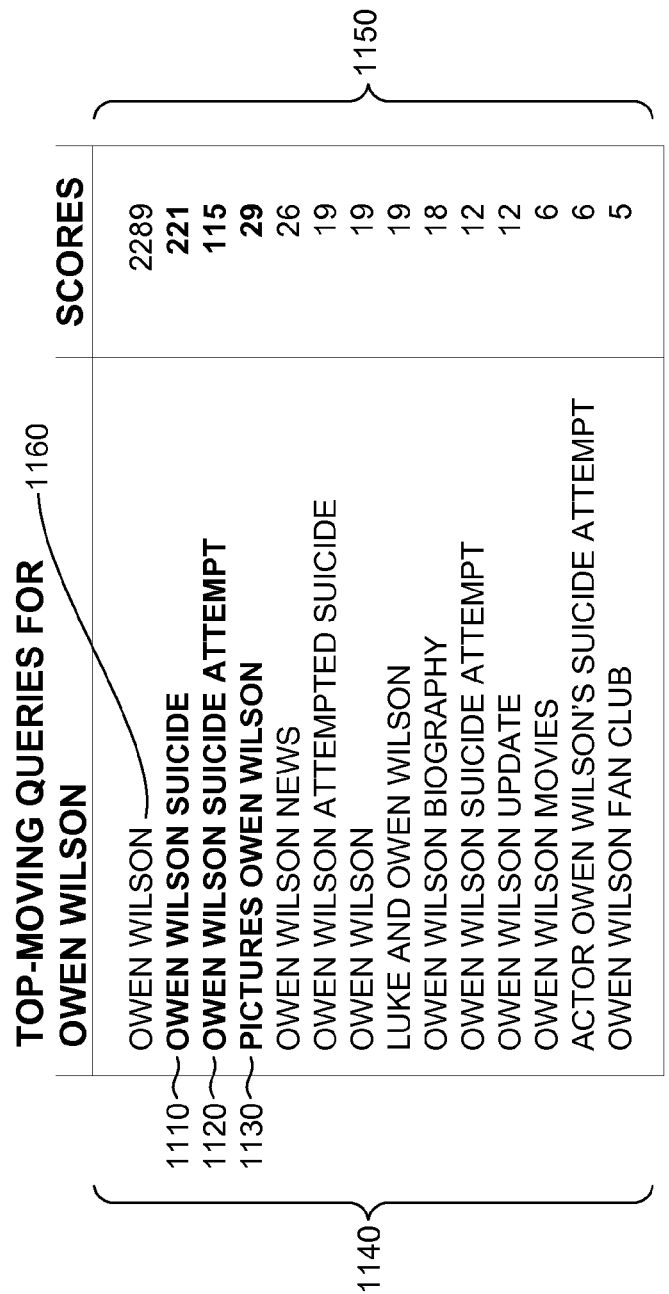
FIGS. 11 and 12 are exemplary ranked lists of user-submitted queries with top-moving queries indicated upon applying various filters to the ranked lists, in accordance with an embodiment of the present invention.
Figure 12:
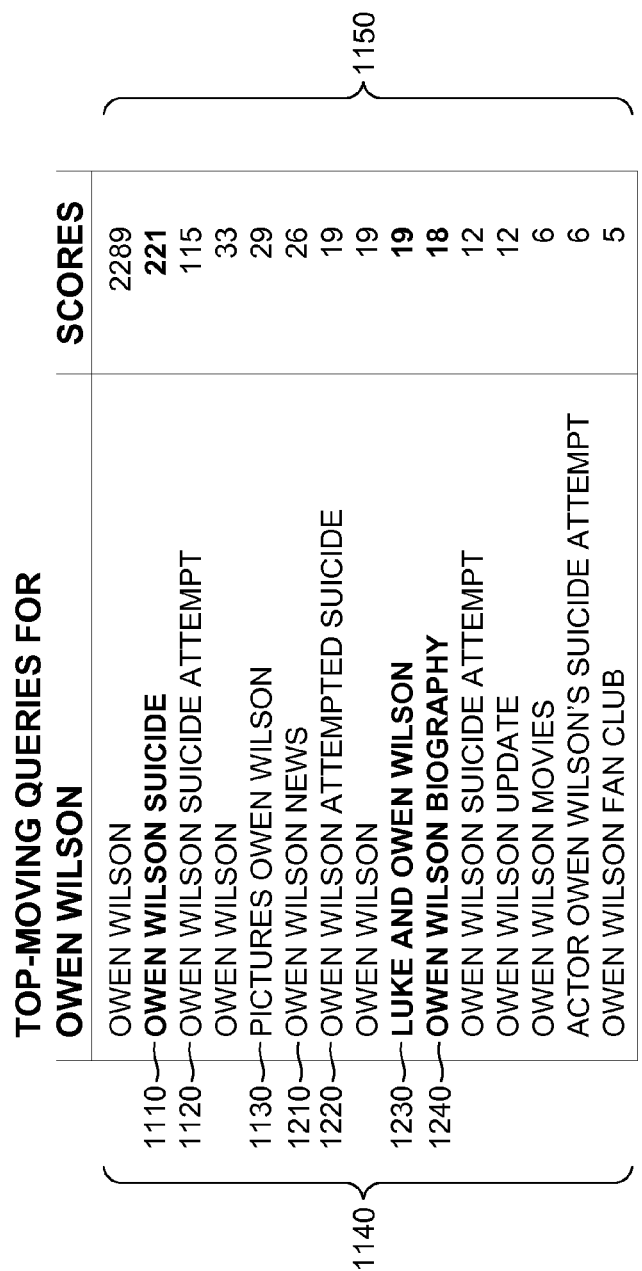

The process of applying filters to ranked queries to determine top-moving queries therefrom is exemplified by FIGS. 11 and 12. In particular, in FIG. 11 an exemplary ranked list 1140 of user-submitted queries with top-moving queries indicated is shown. The indicated top-moving queries 1110, 1120, and 1130 are selected upon applying various filters to the ranked list 1140, in accordance with an embodiment of the present invention. Also illustrated in association with the ranked list 1140 is listing of scores 1150 that represent a number of queries (e.g., within a query group) that share common search terms. For instance, a query 1160 with common search terms "Owen Wilson" is ranked highest because it was queried 2289 times within a particular temporal increment (e.g., day, week, hour, and the like).

However, the query 1160 is not selected as a top-moving query, even though it is highly ranked, because a title-matching filter identified the search terms "Owen Wilson" as being the same as the name of the entity selected. Accordingly, the second, third, and fourth ranked queries are selected as the top-moving queries 1110, 1120, and 1130, respectively. These top-moving queries 1110, 1120, and 1130 attempt to explain why Owen Wilson was popular (e.g., suicide attempt) at the temporal increment at which the user-submitted queries referencing Owen Wilson were collected.

But, as shown in FIG. 12, additional filters may be applied to the ranked list 1140 of queries. For instance, a duplicate query filter may be applied to ranked list 1140. As a result of application, previously selected query 1120 is removed from the top-moving queries 1110, 1230, and 1240 for having a repetitive search term "suicide" as a higher ranked query. As such, the duplicate query filter prevents query 1220 from being selected for the same reason. In another instance, a commonly used keyword filter may be applied to the ranked list 1140. As a result of application, queries 1130 and 1210 are disallowed from inclusion in a set of top-moving queries because the queries 1130 and 1210 include common terms "pictures" and "news," respectively, which do not assist is describing a relevant event that caused Owen Wilson's rise in popularity. Upon application of the filters, the remaining highest ranked queries, based on the listing of the scores 1150, are selected as the top-moving queries 1110, 1230, and 1240 for Owen Wilson. Although, several filters are discussed with reference to FIGS. 11 and 12, it should be understood and appreciated by those of ordinary skill in the art that other types of suitable filters that capture uninteresting search terms may be utilized, as discussed above, and that embodiments of the present invention are not limited to those filters described immediately above.

The present invention has been described in relation to particular embodiments, which are intended in all respects to be illustrative rather than restrictive. Alternative embodiments will become apparent to those of ordinary skill-in-the-art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

The invention claimed is:

1. One or more computer-readable memory devices storing computer-usable instructions that, when executed by a processor of a computing device, cause the processor of the computing device, to perform a method for automatically selecting one or more candidate points on a graphical depiction of queries referencing an entity, the method comprising:
    receiving from a search engine a user-initiated selection of the entity and a time frame in which the queries referencing the entity are to be retrieved, wherein the time frame is divided into temporal increments;
    presenting on a user-interface (UI) display the graphical depiction of a rank of the entity over the time frame, wherein the rank represents a relative popularity of the entity, in relation to a plurality of entities of a predefined category, as determined from the user-submitted queries collected at a search engine;
    automatically initiating a selection procedure for identifying the one or more candidate points on the graphical depiction that are each associated with a positive movement of the rank, wherein the selection procedure comprises:
        (i) identifying locations on the graphical depiction between adjacent inclines and declines as peak points and valley points;
        (ii) ascertaining the rank at the temporal increments corresponding with each of the peak points and the valley points;
        (iii) deriving slope values based on an angle of inclination of the inclines; and
        (iv) based on the rank of the peak points and the valley points, and
    the derived slope values, selecting the one or more candidate points; and
    surfacing the one or more selected candidate points by presenting, at the user-interface (UI) display, an indicator of each of the one or more selected candidate points on the graphical depiction.

2. The one or more devices of claim 1, wherein the plurality of entities of the predefined category comprise substantially comparable subjects of queries grouped according to at least one of people, sports teams, products, geographic locations, music, companies, tools, or types of entertainers.

3. The one or more devices of claim 1, wherein the temporal increments of the graphical depiction represent at least one of months, weeks, days, or units of time that uniformly divide the time frame.

4. The one or more devices of claim 1, wherein selecting the one or more candidate points comprises:
    comparing the rank associated with each of the peak points against each other to determine a highest ranked peak point; and
    identifying the highest ranked peak point with the time frame as one of the one or more candidate points.

5. The one or more devices of claim 4, wherein the method further comprises:
    determining that a plurality of the peak points share the highest ranking;
    tracing backward along the graphical depiction to ascertain a valley point immediately preceding each of the plurality of peak points;
    calculating a rank differential between the valley point associated with each of the plurality of peak points; and
    identifying a peak point of the plurality of peak points associated with a largest rank differential as one of the one or more candidate points, thereby capturing the peak point on the graphical depiction having a greatest positive movement in the rank with respect to a precedent valley point.

6. The one or more devices of claim 4, wherein comparing the rank associated with each of the identified temporal increments comprises:
    determining that a plurality of the peak points share the highest ranking;
    selecting a peak point, of the plurality of the highest ranked peak points, that is latest in time within a scope of the time frame; and
    identifying the latest peak point as one of the one or more candidate points.

7. The one or more devices of claim 1, wherein selecting the one or more candidate points comprises:
    identifying a peak point that is latest in time within a scope of the time frame;
    ascertaining that the slope value of an incline preceding the latest peak point is greater than a predefined threshold slope to ensure sufficient positive movement of the rank is associated with the latest peak point, and
    identifying the latest peak point as one of the one or more candidate points.

8. The one or more devices of claim 1, wherein selecting the one or more candidate points to feature comprises:
    identifying a remainder of the peak points that are not identified as one of the one or more candidate points;
    comparing the slope values of the inclines adjacent to the remaining peak points, and
    identifying a peak point of the remaining peak points adjacent to an incline having a greatest slope value as one of the one or more candidate points.

9. The one or more devices of claim 8, wherein the method further comprising recursively identifying a peak point of the remaining peak points as one of the one or more candidate points until a predefined number of candidate points are accumulated.

10. The one or more devices of claim 8, wherein the method further comprising:
    batching the user-submitted queries received during a scope of a temporal increment associated with a peak point identified as one of the one or more candidate points into query groupings based on commonality of the search terms therein;
    enumerating a number of the user-submitted queries encompassed by each of the query groupings;

determining that the number of the user-submitted queries associated with each of the query groupings fails to meet a predefined threshold; and withdrawing the identified peak point from the one or more candidate points.

11. The one or more devices of claim 1, wherein presenting an indicator for each of the one or more candidate points at a user-interface (UI) display of the graphical depiction comprises surfacing an icon substantially overlaying the peak points associated with each of the one or more candidate points, wherein the graphical depiction is a line graph indicating a movement in rank of the entity over time.

12. The one or more devices of claim 11, wherein the icon exposes information related to its respective peak point upon detecting a user-initiated indication thereof, wherein exposing information comprises causing an explanation object to be displayed in association with the icon, and wherein the explanation object communicates at least one representation of a user-submitted query to rationalize the indicated peak point.

13. A method for automatically selecting one or more candidate points on a graphical depiction of queries referencing an entity, the method comprising:

receiving from a search engine a user-initiated selection of the entity and a time frame in which the queries referencing the entity are to be retrieved, wherein the time frame is divided into temporal increments;

presenting on a user-interface (UI) display the graphical depiction of a rank of the entity over the time frame, wherein the rank represents a relative popularity of the entity, in relation to a plurality of entities of a predefined category, as determined from the user-submitted queries collected at a search engine;

automatically initiating a selection procedure for identifying the one or more candidate points on the graphical depiction that are each associated with a positive movement of the rank, wherein the selection procedure comprises:
  (i) identifying locations on the graphical depiction between adjacent inclines and declines as peak points and valley points;
  (ii) ascertaining the rank at the temporal increments corresponding with each of the peak points and the valley points;
  (iii) deriving slope values based on an angle of inclination of the inclines; and
  (iv) based on the rank of the peak points and the valley points, and the derived slope values, selecting the one or more candidate points; and surfacing the one or more selected candidate points by presenting, at the user-interface (UI) display, an indicator of each of the one or more selected candidate points on the graphical depiction.

\* \* \* \* \*